(12) United States Patent
Maeda et al.

(10) Patent No.: US 7,395,410 B2
(45) Date of Patent: Jul. 1, 2008

(54) PROCESSOR SYSTEM WITH AN IMPROVED INSTRUCTION DECODE CONTROL UNIT THAT CONTROLS DATA TRANSFER BETWEEN PROCESSOR AND COPROCESSOR

(75) Inventors: Masaki Maeda, Osaka (JP); Hiroyuki Morishita, Toyonaka (JP); Takeshi Tanaka, Moriguchi (JP); Tokuzo Kiyohara, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 136 days.

(21) Appl. No.: 11/172,601

(22) Filed: Jun. 30, 2005

(65) Prior Publication Data
US 2006/0010305 A1 Jan. 12, 2006

(30) Foreign Application Priority Data
Jul. 6, 2004 (JP) ............................. 2004-199138

(51) Int. Cl.
*G06F 15/16* (2006.01)
(52) U.S. Cl. ............................. 712/34; 712/31; 712/225
(58) Field of Classification Search .............. 712/34–35
See application file for complete search history.

(56) References Cited

U.S. PATENT DOCUMENTS

| | | | | |
|---|---|---|---|---|
| 4,715,013 A | * | 12/1987 | MacGregor et al. | ......... 712/203 |
| 4,914,578 A | * | 4/1990 | MacGregor et al. | ......... 710/260 |
| 5,892,965 A | * | 4/1999 | Miura et al. | ................... 712/34 |
| 6,032,247 A | * | 2/2000 | Asghar et al. | .................. 712/35 |
| 6,223,274 B1 | * | 4/2001 | Catthoor et al. | ............... 712/34 |
| 6,247,113 B1 | * | 6/2001 | Jaggar | ......................... 712/200 |
| 6,434,689 B2 | * | 8/2002 | Fleck et al. | .................... 712/34 |
| 6,532,530 B1 | * | 3/2003 | Kim et al. | ...................... 712/35 |
| 6,671,793 B1 | * | 12/2003 | Swaney et al. | ................. 712/34 |
| 6,826,717 B1 | * | 11/2004 | Draper et al. | .................. 714/39 |
| 2002/0178350 A1 | * | 11/2002 | Chung et al. | ................. 712/241 |
| 2003/0093648 A1 | * | 5/2003 | Moyer | ......................... 712/34 |
| 2004/0024988 A1 | * | 2/2004 | Chauvel et al. | ............... 712/34 |
| 2004/0030862 A1 | * | 2/2004 | Paver et al. | .................... 712/34 |
| 2004/0227763 A1 | * | 11/2004 | Wichman et al. | ............ 345/503 |
| 2005/0033938 A1 | * | 2/2005 | Davis et al. | .................... 712/34 |

* cited by examiner

*Primary Examiner*—Eddie P Chan
*Assistant Examiner*—William B Partridge

(57) ABSTRACT

A processor system includes a main processor having registers and an instruction decode control unit, and a coprocessor. When the main processor performs an operation in accordance with an instruction, the registers store data to be used for the operation and data obtained by the operation, and the control unit sequentially decodes an instruction, and performs a control based on the instruction. When decoding a coprocessor operation instruction to request the coprocessor to perform an operation, which includes operands designating a type of an operation to be performed by the coprocessor, a first register storing data to be used for the operation, and a second register to store data obtained by the operation, the control unit requests the coprocessor to perform the designated type of operation by using a content in the first register, and causes the second register to store a result of the operation.

3 Claims, 18 Drawing Sheets

PROCESSOR SYSTEM WITH AN IMPROVED INSTRUCTION DECODE CONTROL UNIT THAT CONTROLS DATA TRANSFER BETWEEN PROCESSOR AND COPROCESSOR

BACKGROUND OF THE INVENTION (1) Field of the Invention

The present invention relates to a processor system including a processor and a coprocessor. The present invention particularly relates to techniques to control transfer of data used to perform an operation and data obtained as a result of an operation, between the coprocessor that performs a predetermined operation and the processor.

(2) Description of the Related Art

A conventional computing system includes a processor system. This processor system has a general purpose processor (hereinafter referred to as "a main processor") and a processor for a specific operation (hereinafter referred to as "a coprocessor"), and is configured so that these processors operate in cooperation with each other.

Such a processor system including a main processor and a coprocessor is, for example, utilized for a video image encoding process in accordance with the Moving Picture Experts Group (MPEG) format.

This video image encoding process involves calculations, a large part of which are motion estimation (ME) processes. Here, ME requires calculation of absolute differences, for each piece of pixel data, between the frames constituting a video image to be encoded, and calculation of the sum of the absolute differences, and the calculations are generally performed based on a great deal of pieces or pixel data. Therefore, a very large number of operations are performed in relation to the calculation of absolute differences and the sum of the absolute differences.

Hence, absolute differences and the sum of the absolute differences are calculated by the coprocessor that has an arithmetic and logic unit (ALU) designed exclusively for performing calculations in parallel, and other processes necessary for the encoding process are performed by the main processor. In this way, the number of clock cycles (hereinafter simply referred to as "cycles") required to complete the entire encoding process is reduced.

As stated above, this processor system in which the main processor and coprocessor operate in cooperation with each other can naturally complete a desired process within a smaller number of cycles than a processor system formed by using a single processor. Accordingly, this processor system can complete the desired process even with a relatively low operating frequency.

Generally speaking, a high cost is inevitable for technological development in order to increase an operating frequency of a processor system. Therefore, the reduction in number of cycles produces an effect that a relatively low-cost processor system can be employed to perform a desired process. In addition, a low operating frequency produces an effect of low power consumption.

Here, it has been conventionally known that instructions to cause the coprocessor to perform an operation include a coprocessor data processing instruction and a coprocessor register transfer instruction. The coprocessor register transfer instruction instructs transfer of data used to perform an operation and data obtained as a result of an operation between the main processor and coprocessor (see "KAITEI ARM PROCESSOR (ARM PROCESSOR REDACTED)" by Steve Furber, translated into Japanese under supervision of ARM Ltd., issued on December 18 in Japan, 2001 ($1^{st}$ edition), CQ publishing Co., Ltd., pages 122-126).

The coprocessor register transfer instruction instructs one-way data transfer between the main processor and coprocessor.

In more detail, the coprocessor register transfer instruction can designate a register in the main processor, in terms of only one of data used to perform an operation, i.e. source data, and data obtained as a result of an operation, i.e. destination data.

FIG. 17 illustrates an example of a program to cause the coprocessor to perform an operation.

In the program shown in FIG. 17, the instruction MCR in the line L1 is a coprocessor register transfer instruction that indicates transfer of data to the coprocessor, and gives an instruction to the coprocessor. The instruction MCR includes a first operand "p0", a second operand "0", a third operand "r1", a fourth operand "Cr1", and a fifth operand "Cr2". The first operand specifies the coprocessor. The second operand specifies an operation to be performed by the coprocessor. Here, the second operand having a value "0" indicates that the coprocessor is to perform a specific operation requiring three cycles. The third operand specifies a register in the main processor which stores data used to perform the operation, i.e. source data. The fourth and fifth operands specify registers in the coprocessor which are to be used to perform the operation. The instructions "nop" in the lines L2 and L3 instruct no particular operations, and respectively consume one cycle. The instruction MRC in the line L4 is a coprocessor register transfer instruction that indicates transfer of data from the coprocessor, and gives an instruction to the coprocessor. The instruction MRC includes a first operand "p0", a second operand "1", a third operand "r0", a fourth operand "Cr1", and a fifth operand "Cr2". The first operand specifies the coprocessor. The second operand specifies an operation to be performed by the coprocessor. Here, the second operand having a value "1" indicates that the coprocessor is to perform no operation. The third operand specifies a register in the main processor which is to store data obtained as a result of an operation, i.e. destination data. The fourth and fifth operands specify registers in the coprocessor which are used to perform an operation.

As described above, two coprocessor register transfer instructions are issued for transfer of source data and transfer of destination data, when the coprocessor performs an operation based on the source data stored in the main processor, and the main processor stores the destination data generated as a result of the operation performed by the coprocessor.

SUMMARY OF THE INVENTION

The present invention aims to achieve the above-described useful effects of the reduction in number of cycles. A first object of the present invention is to provide a processor system that requires a smaller number of cycles, than in the related art, for data transfer between a main processor and a coprocessor. A second object of the present invention is to provide an instruction sequence generating apparatus that generates an instruction sequence to be input into the processor system.

The first object can be achieved by a processor system including a main processor and a coprocessor, where the main processor comprises an instruction decode control unit operable to sequentially decode instructions, and perform a control in accordance with each of the instructions. Here, when decoding a request instruction designating (i) a type of an operation to be performed by the coprocessor, (ii) a first storage area storing data to be used to perform the operation, and (iii) a second storage area to store data obtained as a result of a certain operation performed by the coprocessor, the instruction decode control unit performs a control (a) to cause the coprocessor to perform the operation of the designated type by using the data in the first storage area, and (b) to write the data obtained as a result of the certain operation performed by the coprocessor into the second storage area.

This processor system can operate in accordance with a request instruction which requests the coprocessor to perform an operation, where the request instruction designates (i) a type of an operation to be performed by the coprocessor, (ii) a first storage area from which source data is transferred to the coprocessor, and (iii) a second storage area to which the coprocessor transfers destination data. Accordingly, the processor system can achieve a relatively small number of cycles required to complete a desired operation. This achievement is based on that the smaller the number of instructions to complete a desired operation is, the smaller the number of cycles is required, considering a processor system basically needs at least one cycle to execute one instruction. Furthermore, a code size of a program which causes this processor system to execute a request instruction can be made smaller than in the related art. This can reduce a necessary capacity of an instruction memory.

Here, the main processor performs an operation in correspondence with an operation instruction, and has a plurality of registers to store data used for the operation and data obtained as a result of the operation. The request instruction includes (i) first data that specifies one of the plurality of registers as the first storage area, and (ii) second data that specifies one of the plurality of registers as the second storage area. The instruction decode control unit performs the control (a) to cause the coprocessor to perform the operation of the type designated by the request instruction, by using data in the register specified by the first data in the request instruction, and (b) to write the data obtained as a result of the certain operation performed by the coprocessor into the register specified by the second data in the request instruction.

According to this construction, the processor system can operate in accordance with a request instruction to cause the coprocessor to perform an operation, where the request instruction designates one of the registers in the main processor as a register from which source data is transferred, and one of the registers as a register to which destination data is transferred. Accordingly, a single instruction can indicate such a process that the coprocessor performs a specific operation based on a result of an operation by the main processor, and that a result of an operation by the coprocessor is sent to the main processor to be used to perform an operation. This means that a program corresponding to a series of such processes is composed of a smaller number of instructions. As a consequence, the above-described processor system can execute the series of processes more efficiently than in the related art.

Here, the request instruction has a format including (i) a field storing an instruction identification code to distinguish the request instruction from other types of instructions included in all instructions executable on the main processor, (ii) a field storing a coprocessor operation code specifying the type of the operation to be performed by the coprocessor, (iii) a field storing the first data, and (iv) a field storing the second data. The instruction decode control unit performs the control (a) to send the coprocessor operation code included in the request instruction to the coprocessor, (b) to send, to the coprocessor, source data which is the data stored in the register specified by the first data included in the request instruction, and (c) to write resulting data which is the data obtained as a result of the certain operation sent from the coprocessor into the register specified by the second data included in the request instruction. The coprocessor (I) decodes the coprocessor operation code sent from the main processor, (II) performs the operation the type of which is specified by the coprocessor operation code, by using the source data sent from the main processor, and (III) sends resulting data which is data obtained as a result of the same operation to the main processor.

According to this construction, the processor system can execute such a process that the coprocessor performs a specific operation based on a result of an operation by the main processor, and that a result of the specific operation by the coprocessor is sent to the main processor to be used to perform an operation, in accordance with a single instruction designating (i) a register in the main processor from which data is transferred to the coprocessor, (ii) a type of an operation to be performed by the coprocessor, and (iii) a register in the main processor to which the coprocessor transfers data.

Here, when performing the control to send the coprocessor operation code included in the request instruction to the coprocessor, the instruction decode control unit performs a control to send the second data included in the request instruction to the coprocessor. When sending, to the main processor, the resulting data obtained as a result of the operation the type of which is specified by the coprocessor operation code sent from the main processor, the coprocessor also sends, back to the main processor, the second data that has been sent from the main processor, together with the coprocessor operation code. The instruction decode control unit receives the resulting data and second data sent from the coprocessor, and writes the received resulting data into the register specified by the received second data.

According to this construction, the main processor does not need to continue storing thereon information indicating a register to store a result of an operation performed by the coprocessor in correspondence with a request instruction, for several cycles from when the main processor sends a trigger signal (a coprocessor operation code and the like) to cause the coprocessor to start the operation in correspondence with the request instruction to when the coprocessor sends a result of the operation in correspondence with the request instruction to the main processor. In other words, the main processor is only required to store a result of an operation performed by the coprocessor, into a register specified by information which the main processor sends to the coprocessor, and later receives back from the coprocessor.

Here, the resulting data that is controlled, by the instruction decode control unit, to be written into the register specified by the second data included in the request instruction is the resulting data obtained as a result of the operation designated by the same request instruction. The instruction decode control unit (i) prestores thereon time information indicating a time period required to complete an operation, for each type, and (ii) performs the control to write, into the register specified by the second data included in the request instruction, resulting data which is sent from the coprocessor when a time period indicated by time information corresponding to the type specified by the coprocessor operation code in the request instruction has elapsed after sending the coprocessor operation code and source data in the request instruction to the coprocessor.

According to this construction, the main processor is required to store thereon information indicating a register to which a result of an operation by the coprocessor in correspondence with a request instruction is to be stored, after causing the coprocessor to start the operation. However, the main processor itself can specify a timing to obtain a result of the operation, which is output by the coprocessor onto a data path, and therefore does not require a signal indicating that the operation in correspondence with the request instruction has been completed to be sent from the coprocessor. The main processor obtains and stores the result of the operation into the register specified by the information stored thereon.

Here, the instruction decode control unit performs a control to send a predetermined signal to the coprocessor, when performing the control to write the resulting data sent from the coprocessor into the register specified by the second data included in the request instruction. The coprocessor continues outputting the resulting data until detecting the predetermined signal sent from the main processor, and stops outputting the resulting data after the detection.

Take a case, as an example, where the main processor performs an appropriate operation in response, to an interruption signal from an external source, after causing the coprocessor to start an operation in correspondence with a request instruction while executing a program including the request instruction. As this example suggests, there are cases where the main processor can not write, into a register, data output onto a data path as a result of the operation performed by the coprocessor, immediately after the end of this operation by the coprocessor. According to the above-described processor system, however, a signal indicating the result is written is sent to the coprocessor, when the result is written into the register after the writing becomes possible, in other words, immediately before the result is written, while the result is being written, or immediately after the result has been written. The coprocessor, on the other hand, continues outputting the result until receiving the signal indicating the result is written. As a consequence, the main processor can reliably obtain the result of the operation performed by the coprocessor.

Here, for an operation of any type, the coprocessor outputs resulting data when the same time period elapses since a start of the operation. The resulting data that is controlled, by the instruction decode control unit, to be written into the register specified by the second data included in the request instruction is resulting data which is sent from the coprocessor, and obtained as a result of an operation designated by a different request instruction that is decoded prior to the request instruction. After sending the coprocessor operation code included in the request instruction to the coprocessor, but before decoding a different instruction subsequently to the request instruction, the instruction decode control unit performs the control to write the resulting data sent from the coprocessor as a result of the operation designated by the different request instruction that is decoded prior to the request instruction, into the register specified by the second data included in the request instruction.

This construction is useful for a case where the processor system decodes and executes a plurality of continuous request instructions under an assumption that the coprocessor performs a requested operation in a pipeline construction manner. A request instruction included in the continuous request instructions can designate not only a register storing data to be provided with the coprocessor, but also a register to receive a result of an operation performed by the coprocessor in correspondence with a request instruction prior to this request instruction. Which is to say, it requires only one instruction to designate a data storage location in the main processor for data transferred from the main processor to the coprocessor, and a data storage location in the main processor for data transferred from the coprocessor to the main processor. As a consequence, when compared with the related art, the number of instructions necessary to attain a certain goal can be decreased, which can reduce the number of cycles necessary to attain the goal.

Here, the instruction decode control unit performs the control to write data obtained as a result of the operation the type of which is designated by the request instruction into the register specified by the second data included in the same request instruction.

According to this construction, a request instruction includes designation of an operation, and designation of a resister, in the main processor, to store a result of this operation to be performed by the coprocessor. Therefore, a request instruction to cause the coprocessor to perform an operation can have the same instruction format as a general operation instruction, which includes an operand specifying a register to store a result of an operation in correspondence with the operation instruction. This helps programmers to understand instructions with increasing ease, for example.

Here, the processor system further includes another coprocessor having a plurality of registers. The request instruction includes (i) the designation of the type of the operation to be performed by the coprocessor, (ii) first data specifying one of the plurality of registers included in the other coprocessor as the first storage area, and (iii) second data specifying one of the plurality of registers included in the other coprocessor as the second storage area. The instruction decode control unit performs the control (a) to cause the coprocessor to perform the operation the type of which is designated by the request instruction, by using data in the register in the other coprocessor specified by the first data in the request instruction, and (b) to write data obtained as a result of an operation performed by the coprocessor into the register in the other coprocessor specified by the second data in the request instruction.

According to this construction, it requires only one instruction to cause the coprocessor to perform an operation based on data in a different coprocessor, and to write a result of this operation into the different coprocessor.

The second object can be achieved by an instruction sequence generating apparatus for generating, based on input data, an instruction sequence written in a machine language to be executed on the main processor included in the processor system together with the coprocessor. The instruction sequence generating apparatus comprises a storing unit, an input data obtaining unit operable to obtain the input data, an instruction sequence generating unit operable to generate the instruction sequence written in the machine language based on the input data, and store the instruction sequence into the storing unit. Here, the instruction sequence includes a request instruction designating (i) a type of an operation to be performed by the coprocessor, (ii) a first storage area storing data used to perform the operation, the first storage area being external to the coprocessor, and (iii) a second storage area to store data obtained as a result of an operation performed by the coprocessor, the second storage area being external to the coprocessor.

This instruction sequence generating apparatus can be used to provide an instruction sequence to be decoded and executed by the above-described processor system. To be specific, the instruction sequence generating apparatus can generate an instruction sequence including a request instruction that, on its own, designates that the coprocessor performs an operation based on a content in a storage area external to the coprocessor, and that a result of the operation is stored into a storage area external to the coprocessor.

Here, the request instruction generated by the instruction sequence generating unit has a format including (i) a field storing an instruction identification code to distinguish the request instruction from other types of instructions included in all instructions executable on the main processor, (ii) a field storing a coprocessor operation code specifying the type of the operation to be performed by the coprocessor, (iii) a field storing first data that specifies, as the first storage area, one of a plurality of registers included in the main processor, and (iv) a field storing second data that specifies, as the second storage area, one of the plurality of registers included in the main processor.

The instruction sequence generating apparatus can generate an instruction sequence including a request instruction that, on its own, designates that the coprocessor performs an operation based on a content in a register included in the main processor, and that a result of the operation is stored into a register included in the main processor.

Here, the instruction sequence generating apparatus further comprises an operation time managing unit prestoring time information indicating a time period required to complete an operation which the coprocessor is operable to perform, for each type. When generating, at a position after the request instruction in the instruction sequence, an operation instruction corresponding to an operation to be performed using data in the register in the main processor specified by the second data included in the request instruction, the instruction sequence generating unit (i) specifies a time period required to complete the operation the type of which is designated by the coprocessor operation code included in the request instruction, based on the time information stored in the operation time managing unit, and (ii) inserts instructions whose number is equivalent to or exceeds the specified time period, between the operation instruction and the request instruction.

This instruction sequence generating apparatus can generate an instruction sequence that can solve a problem that may occur when an operation instruction is positioned after a request instruction, and an operation in correspondence with the operation instruction is performed based on destination data designated by the request instruction. Such a problem is that the coprocessor is still performing an operation in correspondence with the request instruction, and has not yet generated the destination data, at a time when the main processor starts executing the operation instruction.

BRIEF DESCRIPTION OF THE DRAWINGS

These and other objects, advantages, and features of the invention will become apparent from the following description thereof taken in conjunction with the accompanying drawings, which illustrate a specific embodiment of the invention. In the drawings.

DESCRIPTION OF THE PREFERRED EMBODIMENT

First Embodiment

The following describes a processor system relating to a first embodiment of the present invention.

SUMMARY

The processor system 100 relating to the first embodiment of the present invention includes a main processor and a coprocessor. The main processor fetches, decodes, and executes an instruction set, which includes a coprocessor operation instruction to cause the coprocessor to perform an operation. The following shows a xexec instruction, which is an example of the coprocessor operation instruction, using mnemonic codes.

xexec OPn, dstRn, srcRn

In the coprocessor operation instruction which is a xexec instruction, three operands including OPn, dstRn, and srcRn need to be designated. The operand OPn designates a type of an operation to be performed by the coprocessor. The operand srcRn designates a number indicating a register in the main processor which stores source data to be used for the operation performed by the coprocessor. The operand dstRn designates a number indicating a register in the main processor which is to store a result of the operation performed by the coprocessor.

When fetching and decoding this coprocessor operation instruction, the main processor requests the coprocessor to perform an operation, by sending the source data, in other words, a content in the register designated by the operand srcRn, and the operation type, to the coprocessor. In response to this request, the coprocessor performs an operation using the source data, and sends a result of the operation, in other words, destination data, to the main processor. The main processor receives and stores the destination data into the register designated by the operand dstRn.

As stated above, a single coprocessor operation instruction includes designation of a type of an operation to be performed by the coprocessor, designation related to transfer of source data from the main processor to the coprocessor, and designation related to transfer of destination data from the coprocessor to the main processor. If the processor system can make use of this coprocessor operation instruction, the processor system achieves a relatively small number of cycles to complete a desired operation. This achievement is based on that the smaller the number of instructions to achieve a predetermined goal is, the smaller the number of cycles is required, considering the processor system basically requires at least one cycle to execute one instruction.

Figure 1:
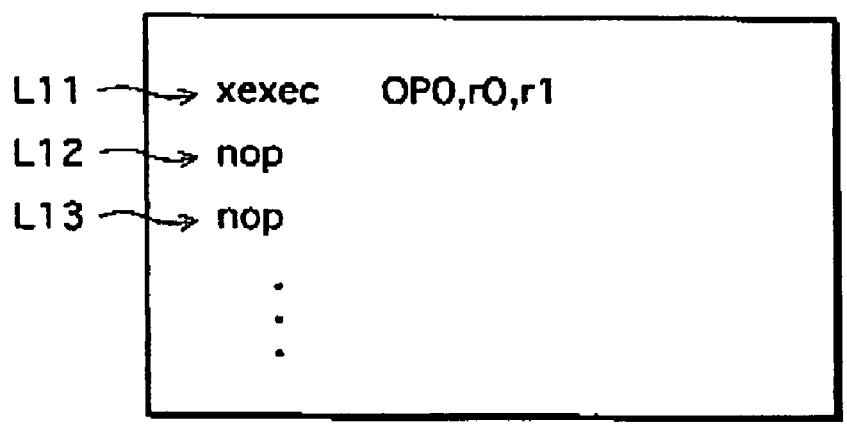
FIG. 1 illustrates, as an example, part of an assembler program including a xexec instruction.

FIG. 1 illustrates, as an example, part of an assembler program including a xexec instruction.

The main processor can decode and execute this program, in effect, program code obtained by converting the program into a machine language.

The line L11 is a xexec instruction which indicates that the coprocessor performs an operation identified by the operand OP0 by using a content stored in a register r1, and that a result of the operation is stored into a register r0. The lines L12 and L13 each indicate an instruction that consumes one cycle.

Suppose the coprocessor requires three cycles to complete the operation identified by the operand OP0. An instruction subsequent to the line L13 in the program shown in FIG. 1 can indicate an operation performed using a content stored in the register r0, under an assumption that the register r0 stores thereon the result obtained by executing the preceding xexec instruction.

The following describes the processor system 100 relating to the first embodiment, in detail.

<Format of Coprocessor Operation Instruction>

To start with, the following describes the format of the above-mentioned coprocessor operation instruction (a xexec instruction) which is included in an instruction set executed by the main processor.

Figure 2:
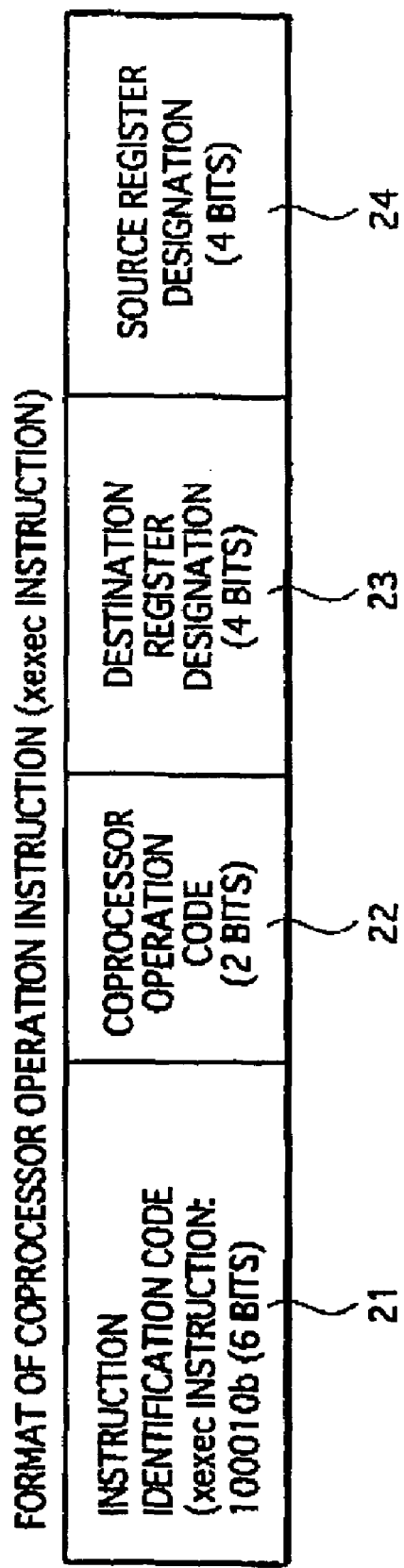
FIG. 2 illustrates a format of a coprocessor operation instruction (a xexec instruction)

FIG. 2 illustrates the format of the coprocessor operation instruction (a xexec instruction).

As shown in FIG. 2, the xexec instruction has a length of 16 bits. The xexec instruction includes an instruction identification code field 21, a coprocessor operation code field 22, a destination register designation field 23, and a source register designation field 24. The fields 22, 23, and 24 are used to designate the operands.

The instruction identification code field 21 is used to set a 6-bit instruction identification code which distinguishes a xexec instruction from other types of instructions in an instruction group which the main processor can decode and execute. The 6-bit instruction identification code has a predetermined value of 100010b, for example.

The coprocessor operation code field 22 corresponds to the operand OPn, and is used to set a 2-bit code to identify a type of an operation to be performed by the coprocessor. Here, this bit length is determined by the assumption that the coprocessor can perform four or less different types of operations.

The destination register designation field 23 corresponds to the operand dstRn, and is used to set 4-bit data to identify one of registers included in the main processor. The destination register designation field 23 is used to designate a register to store a result of the operation, ire destination data, that is sent from the coprocessor.

The source register designation field 24 corresponds to the operand srcRn, and is used to set 4-bit data to identify one of the registers included in the main processor. The source register designation field 24 is used to designate a register that stores data to be used for the operation by the coprocessor, i.e. source data.

<Construction of Processor System>

Figure 3:
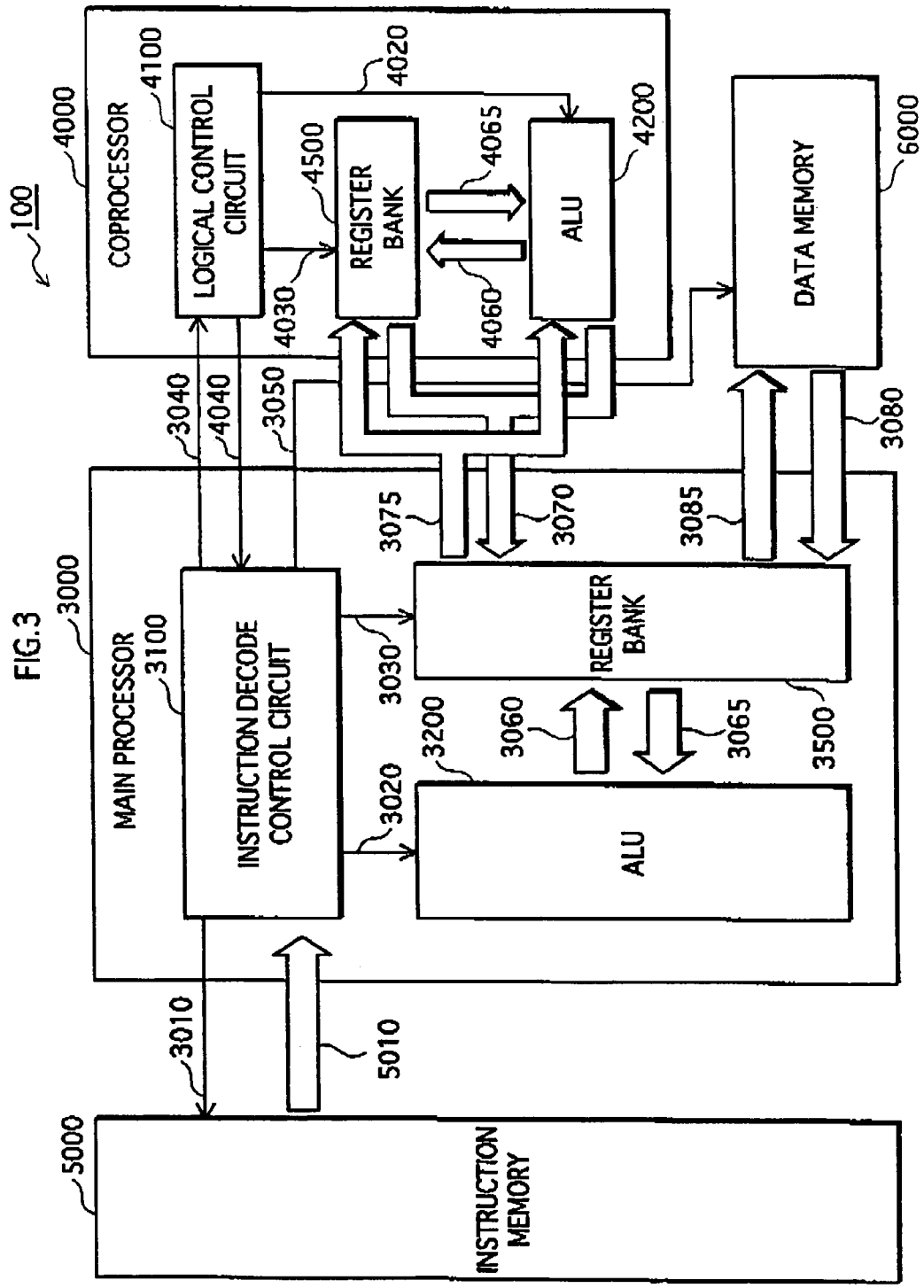
FIG. 3 is a block diagram illustrating a construction of a processor system relating to a first embodiment.

FIG. 3 is a block diagram illustrating a construction of the processor system 100 relating to the first embodiment.

As shown in FIG. 3, a processor system 100 includes a main processor 3000, a coprocessor 4000, an instruction memory 5000 storing an instruction sequence including a coprocessor operation instruction, and a data memory 6000 to/from which the main processor 3000 writes/reads data.

The main processor 3000 is obtained by partly modifying a conventional processor. The main processor 3000 includes an instruction decode control circuit 3100, an ALU 3200 which is a circuit group for performing arithmetic and logical operations, and a register bank 3500 that is a group of registers, and is configured to perform data transfer with the ALU 3200. The main processor 3000 can perform one or more operations, while the coprocessor 4000 is performing a different operation.

The instruction decode control circuit 3100 has a function of sequentially reading and decoding an instruction from an instruction sequence stored in the instruction memory 5000, and performing a control in accordance with the decoded instruction. For example, the instruction decode control circuit 3100 performs a control related to an access to the register bank 3500 and data memory 6000, in other words, data transfer control, a control to cause the ALU 3200 to perform an operation designated by the instruction, a control of the coprocessor 4000, and a control related to reading of an instruction from the instruction memory 5000. When decoding the above-described coprocessor operation instruction, the instruction decode control circuit 3100 controls the coprocessor 4000, by sending designation of an operation type included in the decoded coprocessor operation instruction, to the coprocessor 4000, and executing some other processes. The construction of the register bank 3500 and the data transfer operation of the register bank 3500 are described in detail later.

The coprocessor 4000 is formed by partly modifying a conventional coprocessor. The coprocessor 4000 includes a logical control circuit 4100, an ALU 4200 which is a circuit for performing a specific operation, and a register bank 4500 that is a group of registers, and is configured to perform data transfer with the ALU 4200. The coprocessor 4000 can, one by one, perform an operation a type of which is designated by the main processor 3000. Note that the main processor 3000 and coprocessor 400 have the same operating frequency.

The logical control circuit 4100 has a function of receiving and interpreting designation of an operation type sent from the main processor 3000, and, in accordance with the result of the interpretation, controlling data transfer to the register bank 4500, controlling the ALU 4200 to perform a specific operation, and notifying the main processor 3000 of completion of an operation, for example. Furthermore, the logical control circuit 4100 stores thereon data indicating the number of cycles required to complete an operation for each operation type, The logical control circuit 4100 has a mechanism that counts the number of cycles while the ALU 4200 is performing an operation, in order to detect the end of the operation by comparing the counted number with the stored data indicating the number of required cycles.

The ALU 4200 has a function of performing a specific operation. For example, the ALU 4200 may have a function of calculating, in parallel at a relatively high rate, absolute differences and the sum of the absolute differences for the ME process included in the encoding process in accordance with the MPEG format.

In FIG. 3, solid arrows each indicate a transmission line for a control signal (hereinafter referred to as "a control signal line"), and outline arrows each indicate a transmission bus for data including an instruction (hereinafter referred to as "a data path").

A control signal line 3010 transmits a signal sent from the instruction decode control circuit 3100 in order to control the instruction memory 5000. In response to this signal, the instruction memory 5000 sends an instruction to the instruction decode control circuit 3100 via a data path 5010.

A control signal line 3020 transmits a signal sent from the instruction decode control circuit 3100 to control the ALU 3200. A control signal line 3030 transmits a signal sent from the instruction decode control circuit 3100 to control the register bank 3500. A control signal line 3050 transmits a signal sent from the instruction decode control circuit 3100 to control the data memory 6000. A control signal line 3040 transmits a signal sent from the instruction decode control circuit 3100 to send an operation type and the like to the coprocessor 4000.

Between the ALU 3200 and register bank 3500, data is transferred via a data path 3060 and a data path 3065. Between the register bank 3500 and data memory 6000, data is transferred via a data path 3080 and a data path 3085. Between the ALU 4200 and register bank 4500, data is transferred via a data path 4060 and a data path 4065. Between the register bank 3500 in the main processor 3000 and the register bank 4500 in the coprocessor 4000, data is transferred via a data path 3070 and a data path 3075.

Figure 4:
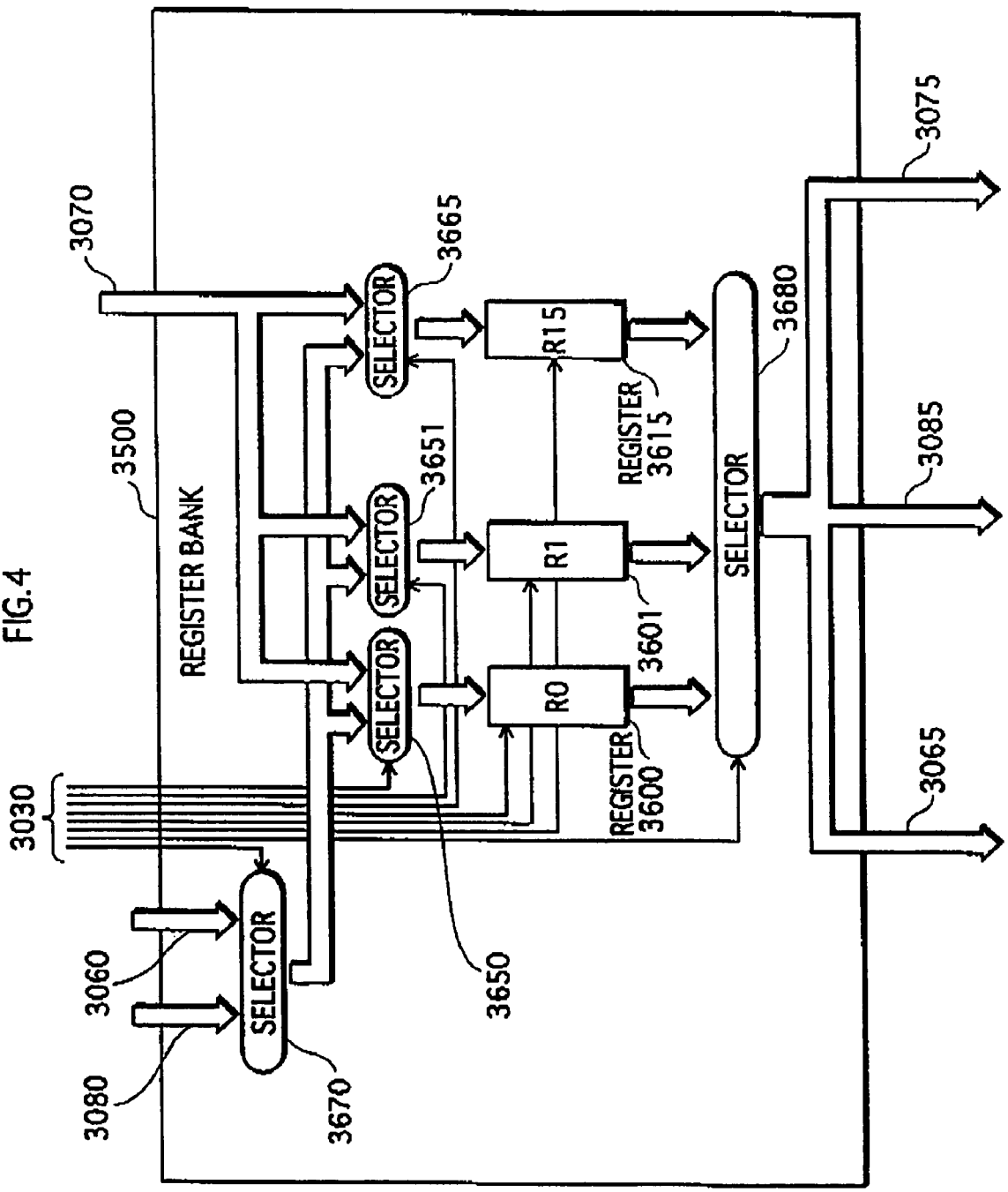
FIG. 4 illustrates, in detail, a construction of a register bank 3500.

FIG. 4 illustrates, in detail, a construction of the register bank 3500.

The register bank 3500 includes a register 3600 (R0), a register 3601 (R1), . . . a register 3615 (R15), a selector 3650, a selector 3651, . . . a selector 3665, a selector 3670, and a selector 3680. The selectors 3650 to 3665, and 3670 form a selector group that selects a data path and a register in order to write data into the register. The selector 3680 selects a register and a data path, in order to output data from the register onto the data path.

These registers and selectors are configured to operate in accordance with a control signal sent from the instruction decode control circuit 3100 via the control signal line 3030.

Suppose the instruction decode control circuit 3100 decodes an instruction, and a result of the decoding indicates that data should be written into a register. The instruction decode control circuit 3100 supplies an appropriate control signal in order to control the selectors 3670, and 3650 to 3665, By doing so, one of data output from the data memory 6000 onto the data path 3080, data output from the ALU 3200 onto the data path 3060, and data output from the coprocessor 4000 onto the data path 3070 is supplied to a register to which the selected data should be written. The instruction decode control circuit 3100 supplies a control signal to this register, so that the register stores thereon the data. Suppose the instruction decode control circuit 3100 decodes an instruction, and a result of the decoding indicates that a register should supply data onto a data path. The instruction decode control circuit 3100 supplies a control signal to the register, so that the register outputs data. At the same time, the instruction decode control circuit 3100 supplies an appropriate control signal to the selector 3680, so that the data output from the register is present on the data path 3065 to the ALU 3200, data path 3085 to the data memory 6000, and data path 3075 to the coprocessor 4000.

<Procedure in Correspondence with General Operation Instruction>

According to the above-described processor system 100, operation instructions other than a coprocessor operation instruction are executed chiefly by the ALU 3200 in the main processor 3000. In this case, the main processor 3000 operates in the same manner as a general processor.

For example, suppose the instruction decode control circuit 3100 reads and decodes an operation instruction from the instruction memory 5000, and a result of the decoding indicates that an operation should be performed based on a content in the internal register R0 and resulting data is stored into the internal register R1. The instruction decode control circuit 3100 controls the selector 3680 so that the register R0 outputs data stored thereon to the data path 3065 and the like. The instruction decode control circuit 3100 then controls the ALU 3200 to perform an operation by using the output data, and to output a result of the operation to the data path 3060. The instruction decode control circuit 3100 then controls the selector 3670, selector 3651, and register R1, so that the data on the data path 3060 is written into the register R1.

Here, it should be noted that it takes, for example, several cycles to read data used to perform an operation from a register, perform the operation, and write a result of the operation into a register, and that the number of necessary cycles is different depending on an operation type.

The processing period of the operation in the above-mentioned example includes a period T1, a period T2, and a period T3. In the period T1, the register R0 transfers data to the ALU 3200. In the period T2 that follows the period T1, the ALU 3200 performs the operation. In the period T3 that follows the period T2, the result of the operation is written into the register R1. Here, for example, the period T1 is included in one cycle, the period T2 is included in immediately subsequent one or more cycles, and the period T3 is included in immediately subsequent one cycle. Here, in the case of an operation that is performed based on data output from two registers, one cycle includes, without an overlap, a period T1 during which one of the registers transfers data to the ALU 3200, and a period T1' during which the other register transfers data to the ALU 3200.

<Procedure in Correspondence with Coprocessor Operation Instruction>

The following describes the processes executed by the constituents of the processor system 100 when the processor system 100 executes a coprocessor operation instruction (a xexec instruction).

The instruction decode control circuit 3100 in the main processor 3000 decodes an instruction read from the instruction memory 5000. When judging that the instruction is a xexec instruction according to an instruction identification code, the instruction decode control circuit 3100 performs the following two processes within one cycle, based on contents in the fields (see FIG. 2) of the instruction which designate operands.

As one of the processes, the instruction decode control circuit 3100 sends the content in the coprocessor operation code field, in other words, an operation type, and the content in the destination register designation field, in other words, a designation of a register to store a result of an operation, to the logical control circuit 4100 in the coprocessor 4000 via the control signal line 3040.

As the different one of the processes, the instruction decode control circuit 3100 sends a control signal in order to cause a register designated by the content in the source register designation field to output data onto the data path 3075, to the designated register and selector 3680 via the control signal line 3030.

In response to these processes, the logical control circuit 4100 in the coprocessor 4000 controls the register bank 4500 and ALU 4200 based on the received operation type, so that an operation is performed based on the source data on the data path 3075. The number of cycles required to complete this operation is three cycles, for example, which is determined depending on the operation type.

Here, the logical control circuit 4100 holds thereon the received designation of the register to store the result of the operation. When the operation ends, in other words, in synchronization with an ending timing of the operation which is specified based on the data stored on the logical control circuit 4100 indicating the number of cycles required to complete each type of operation, the logical control circuit 4100 sends a signal indicating the end of the operation which includes the held designation of the register to store the result of the operation, to the instruction decode control circuit 3100 in the main processor 3000 via the control signal line 4040. Note that the data obtained as a result of the operation has been output onto the data path 3070 by the ALU 4200 at the end of the operation. The result of the operation is sent to the main processor 3000 via this data path 3070.

When receiving the signal indicating the end of the operation which includes the designation of the register to store the result of the operation from the logical control circuit 4100, the instruction decode control circuit 3100 sends a control signal, in order to write the data on the data path 3070 into a register designated, by the signal received from the logical control circuit 4100, as the register to store the result of the operation, to the designated register and selectors 3650 to 3665 via the control signal line 3030. In this way, the result of the operation performed by the coprocessor 4000 is stored into the register designated by the content in the destination register designation field in the xexec instruction that is decoded in a cycle several cycles before the current cycle.

Here, the instruction decode control circuit 3100 performs a control, so that one cycle includes, without an overlap, (i) a data transfer period for writing a result of an operation performed by the coprocessor 4000 in accordance with a xexec instruction into a register, and (ii) a data transfer period for writing a result of an operation performed by the internal ALU 3200 in accordance with a general operation instruction following the xexec instruction into a different register.

<Timings of the Processes>

The following specifically describes execution timings of the processes related to execution of a coprocessor operation instruction.

Note that the following assumptions are made. When receiving an interruption signal from an external source while sequentially reading, encoding, and executing instructions constituting a program stored in the instruction memory 5000, the main processor 3000 suspends the execution of the instructions of the program. After performing a process corresponding to the interruption signal, the main processor 3000 resumes the execution of the instructions of the program. Here, the coprocessor 4000 is controlled in synchronization so as to suspend an operation while the main processor 3000 is performing the process corresponding to the interruption signal. Furthermore, the ALU 4200 in the coprocessor 4000 does not have a pipeline construction. Accordingly, the coprocessor 4000 does not receive a coprocessor operation instruction until a result of an operation in accordance with a previous coprocessor operation instruction is written into a register in the main processor 3000. The coprocessor 4000 requires two cycles to complete one operation.

Figure 5:
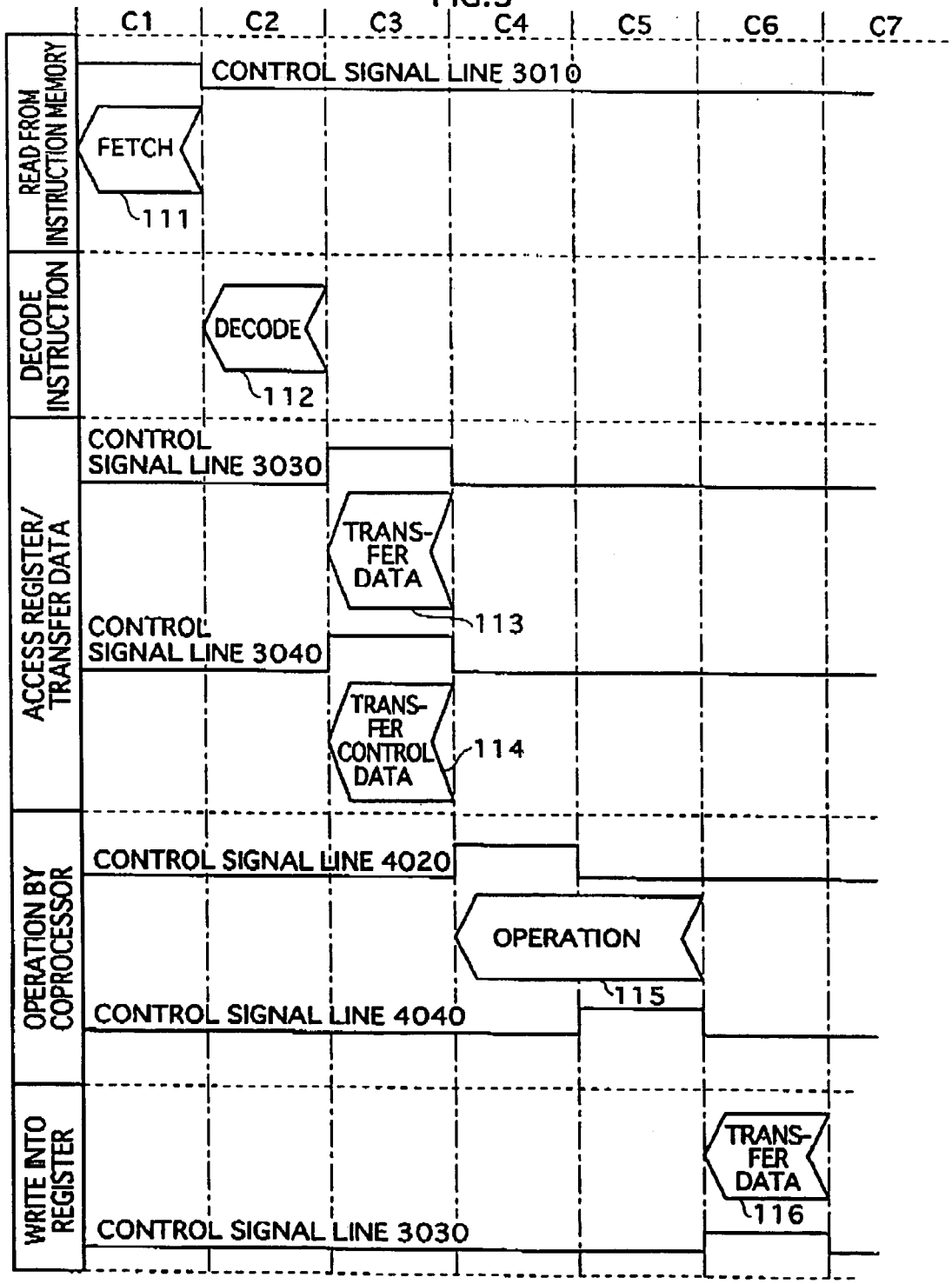
FIG. 5 is a timing chart illustrating processes related to a coprocessor operation instruction.

FIG. 5 is a timing chart illustrating the processes related to a coprocessor operation instruction. In this timing chart, a control signal is expressed in two levels, i.e. at high and low levels. When set at a high level, a signal is active as a trigger.

In a cycle C1, an instruction data fetch process 111 is executed. To be specific, the instruction decode control circuit 3100 sends a control signal via the control signal line 3010, to fetch an instruction from the instruction memory 5000.

In a cycle C2, an instruction decoding process 112 is executed. To be specific, the instruction decode control circuit 3100 decodes the fetched instruction, and identifies registers designated by operands in the xexec instruction.

In a cycle C3, a coprocessor data transfer process 113 and a coprocessor control transfer process 114 are executed. To be specific, the instruction decode control circuit 3100 performs a control via the control signal line 3030. As a result of this control, a register designated by a content in a source register designation field outputs data onto the data path 3075, so that the data is transferred to the coprocessor 4000. Furthermore, the instruction decode control circuit 3100 outputs an operation type and designation of a register to store a result of an operation onto the control signal line 3040, so that the operation type and designation of the register are transferred to the coprocessor 4000.

In cycles C4 and C5, a coprocessor operation 115 is performed. To be specific, in the cycle C4, in accordance with the operation type received via the control signal line 3040, the logical control circuit 4100 sends a control signal via the control signal line 4020, to cause the ALU 4200 to start performing an operation by using the data on the data path 3075. In the cycle C5, the logical control circuit 4100 sends a signal indicating an end of the operation which includes the designation of the register to store the result of the operation, which has been received and kept thereon, to the main processor 3000 via the control signal line 4040. In addition, in the cycle C5, the ALU 4200 completes the operation, and outputs data obtained as a result of the operation to the data path 3070.

In a cycle C6, a main processor data transfer process 116 is executed. To be specific, the instruction decode control circuit 3100 sends a control signal to the register bank 3500 via the control signal line-3030 in accordance with the designation of the register to store the result of the operation included in the received signal indicating the end of the operation. Thus, the instruction decode control circuit 3100 causes the designated register to store thereon the data on the data path 3070.

Here, in parallel with execution of the processes related to the coprocessor operation instruction, the main processor 3000 executes processes related to an instruction subsequent to the coprocessor operation instruction, although this is not illustrated in FIG. 5. For example, in the cycle C2, the main processor 3000 fetches a general operation instruction A subsequent to the above-described xexec instruction, from the instruction memory 5000. In the cycle C3, the main processor 3000 decodes the operation instruction A. In the cycle C4, a register transfers data used to perform an operation related to the operation instruction A, to the ALU 3200. In the cycle C5, the ALU 3200 performs the operation corresponding to the operation instruction A. In the cycle C6, the ALU 3200 transfers the result of the operation to a register. Here, in the cycle C3, the main processor 3000 fetches an operation instruction B subsequent to the operation instruction A from the instruction memory 5000. In the cycle C4, the main processor 3000 decodes the operation instruction B. In the cycle C5, a register transmits data used to perform an operation related to the operation instruction B, to the ALU 3200. In the cycle C6, the ALU 3200 performs the operation corresponding to the operation instruction B. In the cycle C7, the ALU 3200 transfers the result of the operation to a register.

FIRST MODIFICATION EXAMPLE

The following describes a first modification example of the processor system 100. The above-described first embodiment is hereinafter referred to as a basic example, in comparison with the first modification example.

According to the processor system 100 relating to the basic example, the coprocessor 4000 performs, one by one, an operation a type of which is designated by the main processor 3000. A processor system relating to the first modification example is different from the processor system 100 relating to the basic example, in that the coprocessor performs operations in parallel, in a pipeline construction manner. In the following description, the constituents of the processor system relating to the first modification example are represented by using the reference numerals of their corresponding constituents of the processor system 100 relating to the basic example, if necessary.

The following describes execution timings of processes related to execution of a coprocessor operation instruction (a xexec instruction) in the processor system relating to the first modification example.

Note that the following assumptions are made. While the main processor is executing a process corresponding to an interruption, the coprocessor is controlled in synchronization so as to suspend an operation. Furthermore, the ALU in the coprocessor has a pipeline construction. Accordingly, the coprocessor receives a coprocessor operation instruction even before a result of an operation in accordance with a previous coprocessor operation instruction is written into a register in the main processor. The coprocessor performs operations in a pipeline construction manner with two pipeline stages, and requires two cycles to complete one operation.

Figure 6:
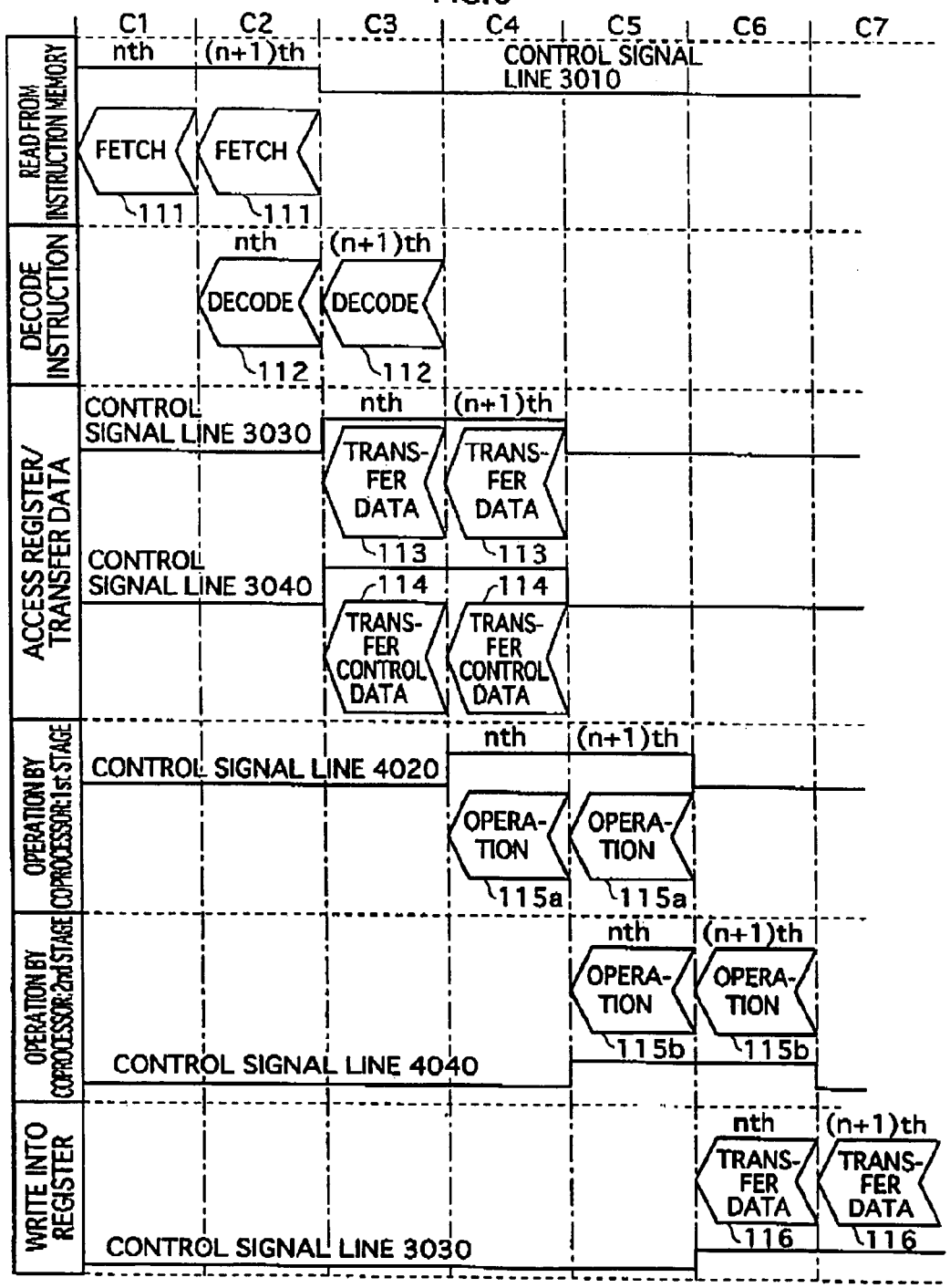
FIG. 6 is a timing chart illustrating processes related to a coprocessor operation instruction in a first modification example.

FIG. 6 is a timing chart illustrating processes related to a coprocessor operation instruction in the first modification example.

The following description is made taking, as an example, an nth instruction and an (n+1)th instruction that are both coprocessor operation instructions.

In a cycle C1, an instruction data fetch process 111 is executed in correspondence with the nth coprocessor operation instruction.

In a cycle C2, an instruction data fetch process 111 is executed in correspondence with the (n+1)th coprocessor operation instruction. Also, an instruction decoding process 112 is executed in correspondence with the nth coprocessor operation instruction. To be specific, the instruction decode control circuit sends a control signal via the control signal line 3010, to fetch the (n+1)th coprocessor operation instruction from the instruction memory. At the same time, the instruction decode control circuit decodes the nth coprocessor operation instruction that is fetched in the cycle C1.

Figure 7:
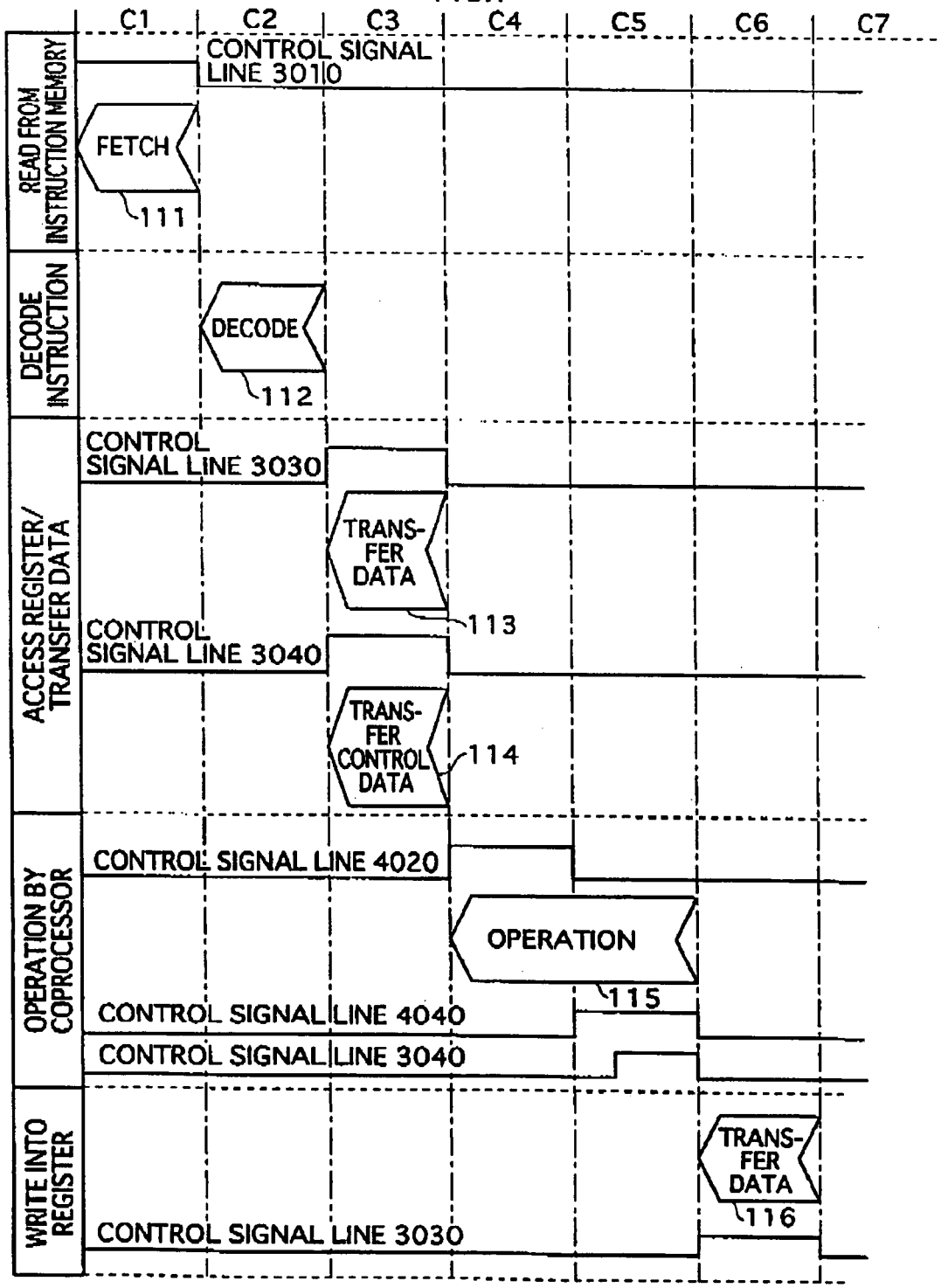
FIG. 7 is a timing chart illustrating processes related to a coprocessor operation instruction in a second modification example.

In each of the subsequent cycles, different processes are executed respectively in correspondence with the nth and (n+1)th coprocessor operation instructions. In FIG. 6, FIG. 7 and other drawings (mentioned later), there are processes that are marked with the same reference numerals as in FIG. 5. Those processes are basically the same as their corresponding processes in FIG. 5 which is used to describe the basic example. The following description only mentions processes marked with different reference numerals.

In a cycle C3, a coprocessor data transfer process 113 and a coprocessor control transfer process 114 are executed in correspondence with the nth coprocessor operation instruction. At the same time, an instruction decoding process 112 is executed in correspondence with the (n+1)th coprocessor operation instruction.

In a cycle C4, a former-half operation 115a of two stages of a coprocessor operation is executed, in correspondence with the nth coprocessor operation instruction. At the same time, a coprocessor data transfer process 113 and a coprocessor control transfer process 114 are executed in correspondence with the (n+1)th coprocessor operation instruction. While the former-half operation 115a is being performed, the logical control circuit continues holding designation of a register to store a result of an operation which has been obtained in correspondence with the nth coprocessor operation instruction to which the former-half operation 115a is related. In addition, the logical control circuit sends a control signal via the control signal line 4020 in accordance with an operation type the logical control circuit has already obtained, to cause the ALU 4200 to start an operation based on the data on the data path 3075. Here, the logical control circuit has therein storage areas the number of which is equal to or more than the number of the pipeline stages, for storing designation of a register to store a result of an operation. These storage areas are realized by using, for example, a First In First Out (FIFO) buffer, from which values are retrieved in a stored order.

In a cycle C5, a latter-half operation 115 of the two stages of the coprocessor operation is executed in correspondence with the nth coprocessor operation instruction. At the same time, a former-half operation 115a is executed in correspondence with the (n+1)th coprocessor operation instruction. In the latter-half operation 115b, the ALU 4200 receives a result of the former-half operation 115a, performs a further operation to complete the coprocessor operation, and outputs data obtained as a result of the operation onto the data path 3070. Here, the logical control circuit sends a signal indicating the end of the operation to the main processor via the control signal line 4040, in correspondence with the nth coprocessor operation instruction. This signal includes the designation of the register to store the result of the operation which has been kept in, for example, the FIFO buffer.

In a cycle C6, a main processor data transfer process 116 is executed in correspondence with the nth coprocessor operation instruction. At the same time, a latter-half operation 115b is performed in correspondence with the (n+1)th coprocessor operation instruction. In the cycle C6, the data on the data path 3070 is written into a register designated by the destination register designation field in the nth coprocessor operation instruction. After this, a result of the operation performed by the ALU 4200 in the coprocessor in accordance with the (n+1)th coprocessor operation instruction is output onto the data path 3070. These timings are achieved by a control performed by the instruction decode control circuit in the main processor.

In a cycle C7, a main processor data transfer process 116 is executed in correspondence with the (n+1)th coprocessor operation instruction.

SECOND MODIFICATION EXAMPLE

The following describes a second modification example of the processor system 100 relating to the basic example.

According to the processor system 100 relating to the basic example, the coprocessor 4000 is controlled in synchronization so as to suspend performing an operation while the main processor 3000 is performing a process corresponding to an interruption. A processor system relating to the second modification example is different from the processor system 100 relating to the basic example, in that the coprocessor continues performing an operation even while the main processor is performing a process corresponding to an interruption. In the following description, the constituents of the processor system relating to the second modification example are represented by using the reference numerals of their corresponding constituents of the processor system 100 relating to the basic example, if necessary.

Similarly to the processor system 100 relating to the basic example, the logical control circuit in the processor system relating to the second modification example (i) receives and holds designation of a register to store a result of an operation, (ii) causes the ALU to perform an operation and to output a result of the operation to the data path 3070, and (iii) sends a signal to the instruction decode control circuit in the main processor via the control signal line 4040 at the end of the operation. This signal indicates the end of the operation, and includes the designation of the register to store the result of the operation. What characterizes the processor system relating to the second modification example is the process executed after this. To be specific, after receiving the signal indicating the end of the operation, the instruction decode control circuit sends a signal indicating reception is possible to the logical control circuit via the control signal line 3040, when the instruction decode control circuit becomes ready to receive the result of the operation Until receiving this signal indicating reception is possible, the logical control circuit sends, in each cycle, the signal indicating the end of the operation, and prevents a new operation, which generates data to be output to the data path 3070, from being performed, in order to keep the data on the data path 3070.

The following describes execution timings of processes related to execution of a coprocessor operation instruction (a xexec instruction) in the processor system relating to the second modification example.

Note that the following assumptions are made. The ALU in the coprocessor does not have a pipeline construction. Accordingly, the coprocessor does not receive a coprocessor operation instruction until a result of an operation in accordance with a previous coprocessor operation instruction is written into a register in the main processor. The coprocessor in the coprocessor requires two cycles to complete one operation.

FIG. 7 is a timing chart illustrating the processes related to a coprocessor operation instruction in the second modification example.

In cycles C1 to C3, the processor system relating to the second modification example operates in the same manner as the processor system 100 relating to the basic example illustrated in FIG. 5.

In cycles C4 and C5, a coprocessor operation 115 is performed. To be specific, in the cycle C4, in accordance with an operation type received via the control signal line 3040, the logical control circuit sends a control signal via the control signal line 4020, to cause the ALU 4200 to start performing an operation by using the data on the data path 3075. In the cycle C5, the logical control circuit sends a signal indicating an end of the operation which includes designation of a register to store a result of an operation, which has been received and kept thereon, to the main processor via the control signal line 4040. In addition, in the cycle C5, the ALU 4200 completes the operation, and the logical control circuit causes the ALU 4200 to output data obtained as a result of the operation to the data path 3070. After this, the logical control circuit waits for a signal indicating reception is possible to be sent via the control signal line 3040.

It should be noted that FIG. 7 shows an example where the main processor does not perform a process corresponding to an interruption, for instance, and therefore sends a signal indicating reception is possible without delay.

According to this example, the logical control circuit receives a signal indicating reception is possible within the cycle C5. Hence, the logical control circuit does not control the ALU 4200 to output the data obtained as a result of the operation to the data path 3070 in a cycle C6.

In the cycle C6, a main processor data transfer process 116 is executed. To be specific, the instruction decode control circuit sends a control signal to the register bank 3500 via the control signal line 3030 in accordance with the designation of the register to store the result of the operation included in the received signal indicating the end of the operation. Thus, the instruction decode control circuit causes the designated register to store thereon the data on the data path 3070.

Figure 8:
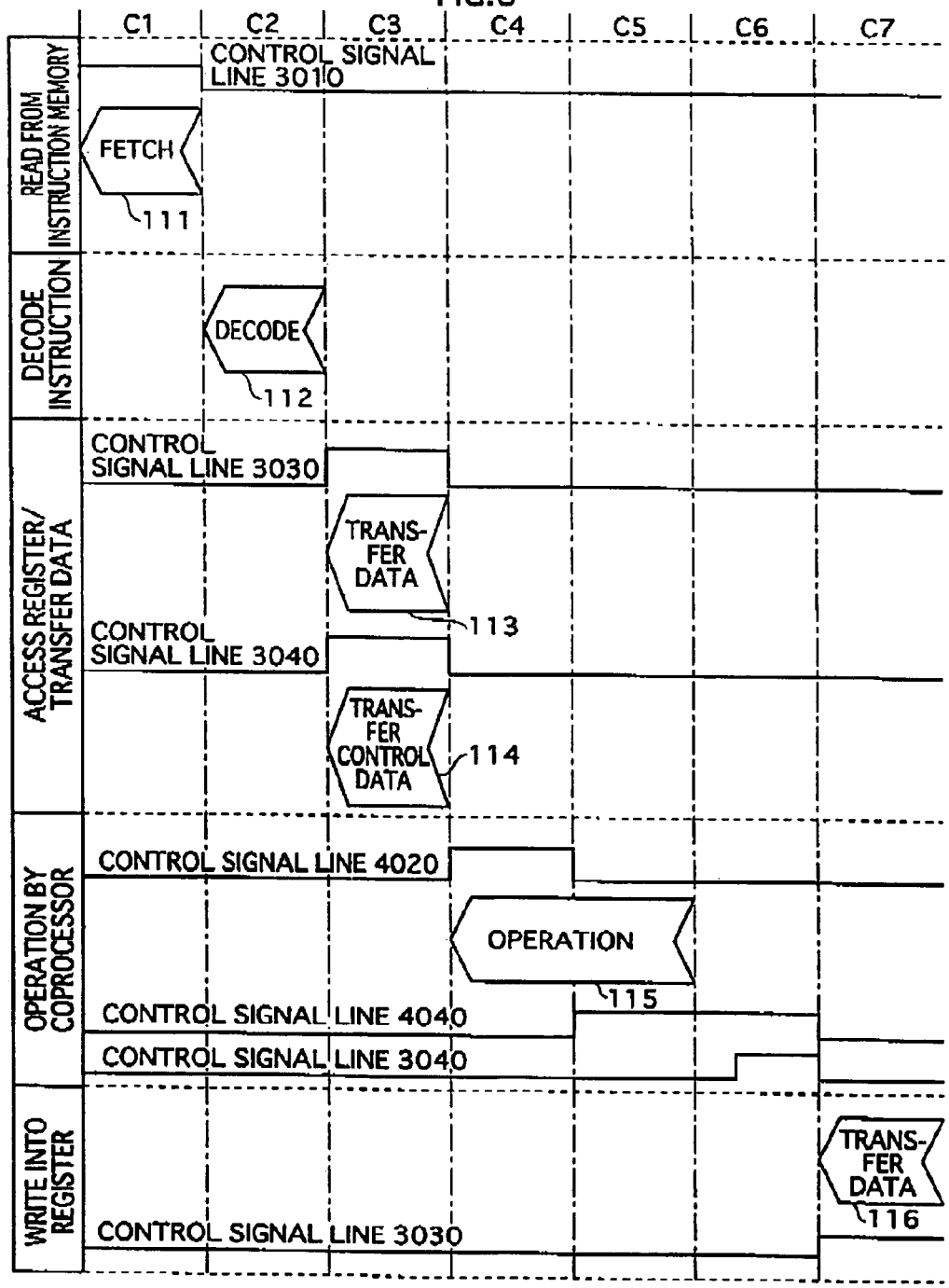
FIG. 8 is a timing chart illustrating, as an example, processes related to a coprocessor operation instruction in the second modification example, in a case where issuance of a signal indicating reception is possible is delayed.

FIG. 8 is a timing chart illustrating, as an example, processes related to a coprocessor operation instruction in the second modification example, in a case where the main processor belatedly sends a signal indicating reception is possible.

According to the example of FIG. 8, after decoding a coprocessor operation instruction, and requesting the coprocessor to perform an operation, the main processor executes a process corresponding to an interruption, for instance. Furthermore, before the main processor completes the process corresponding to the interruption, the coprocessor completes the requested operation.

In cycles C1 to C4, the processor system relating to the second modification example operates in the same manner as in the example of FIG. 7.

In a cycle C5, the logical control circuit sends a signal indicating an end of an operation which includes designation of a register to store a result of the operation, which has been received and kept thereon, to the main processor via the control signal line 4040. In addition, the ALU 4200 completes the operation, and the logical control circuit causes the ALU 4200 to output data obtained as a result of the operation to the data path 3070. After this, the logical control circuit waits for a signal indicating reception is possible to be sent via the control signal line 3040.

In the cycle C5, the logical control circuit does not receive a signal indicating reception is possible. Accordingly, in a cycle C6, the logical control circuit causes the ALU 4200 to output the data obtained as a result of the operation to the data path 3070. Also, the logical control circuit again sends the signal indicating the end of the operation which includes the designation of the register to store the result of the operation, to the main processor via the control signal line 4040. As shown in FIG. 8, the logical control circuit receives a signal indicating reception is possible in the cycle C6. Therefore, in a cycle C7, the logical control circuit does not control the ALU 4200 to output the data obtained as a result of the operation to the data path 3070.

In the cycle C7, a main processor data transfer process 116 is executed. To be specific, the instruction decode control circuit sends a control signal to the register bank 3500 via the control signal line 3030, in accordance with the designation of the register to store the result of the operation included in the received signal indicating the end of the operation. Thus, the instruction decode control circuit causes the designated register to store thereon the data on the data path 3070.

THIRD MODIFICATION EXAMPLE

The following describes a third modification example of the processor system 100 relating to the basic example.

According to a processor system relating to the third modification example, the coprocessor has all of the necessary constructions to perform an operation in a pipeline construction manner, similarly to the first modification example. At the same time, the coprocessor continues performing an operation even while the main processor is executing a process corresponding to an interruption, similarly to the second modification example. In the following description, the constituents of the processor system relating to the third modification example are represented by using the reference numerals of their corresponding constituents of the processor system 100 relating to the basic example, if necessary.

Similarly to the second modification example, according to the processor system relating to the third modification example, after receiving a signal indicating the end of an operation, the instruction decode control circuit sends a signal indicating reception is possible to the logical control circuit via the control signal line 3040, when the instruction decode control circuit becomes ready to receive the result of the operation. Until receiving this signal indicating reception is possible, the logical control circuit sends, in each cycle, the signal indicating the end of the operation, and prevents a new operation, which generates data to be output to the data path 3070, from being performed, to keep the data on the data path 3070.

The following describes execution timings of processes related to execution of a coprocessor operation instruction (a xexec instruction) in the processor system relating to the third modification example.

Note that the following assumptions are made. The ALU in the coprocessor has a pipeline construction. Accordingly, the coprocessor receives a coprocessor operation instruction even before a result of an operation in accordance with a previous coprocessor operation instruction is written into a register in the main processor. The coprocessor performs an operation in a pipeline construction manner with two pipeline stages, and requires two cycles to complete one operation.

Figure 9:
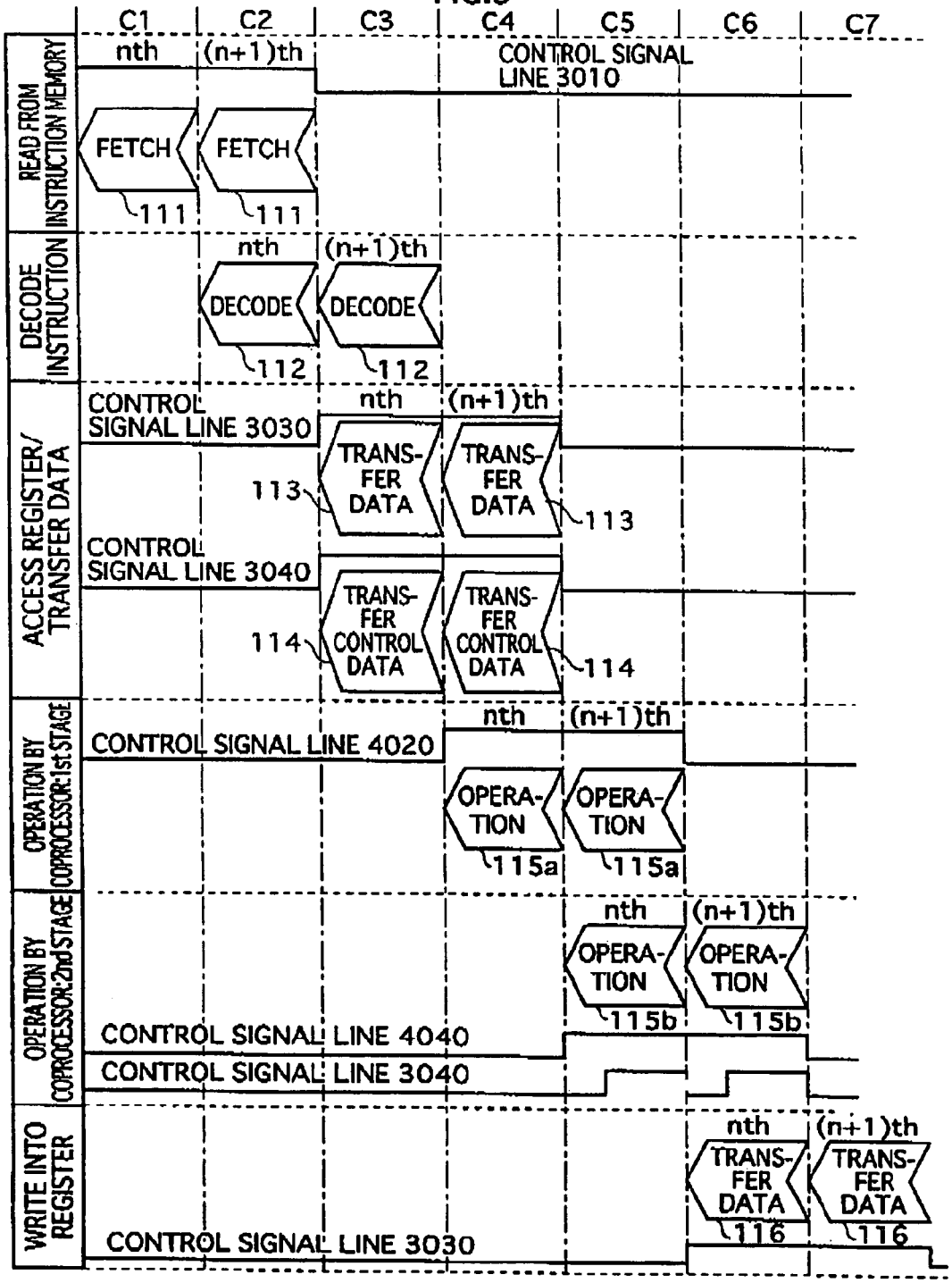
FIG. 9 is a timing chart illustrating processes related to a coprocessor operation instruction in a third modification example.
Figure 10:
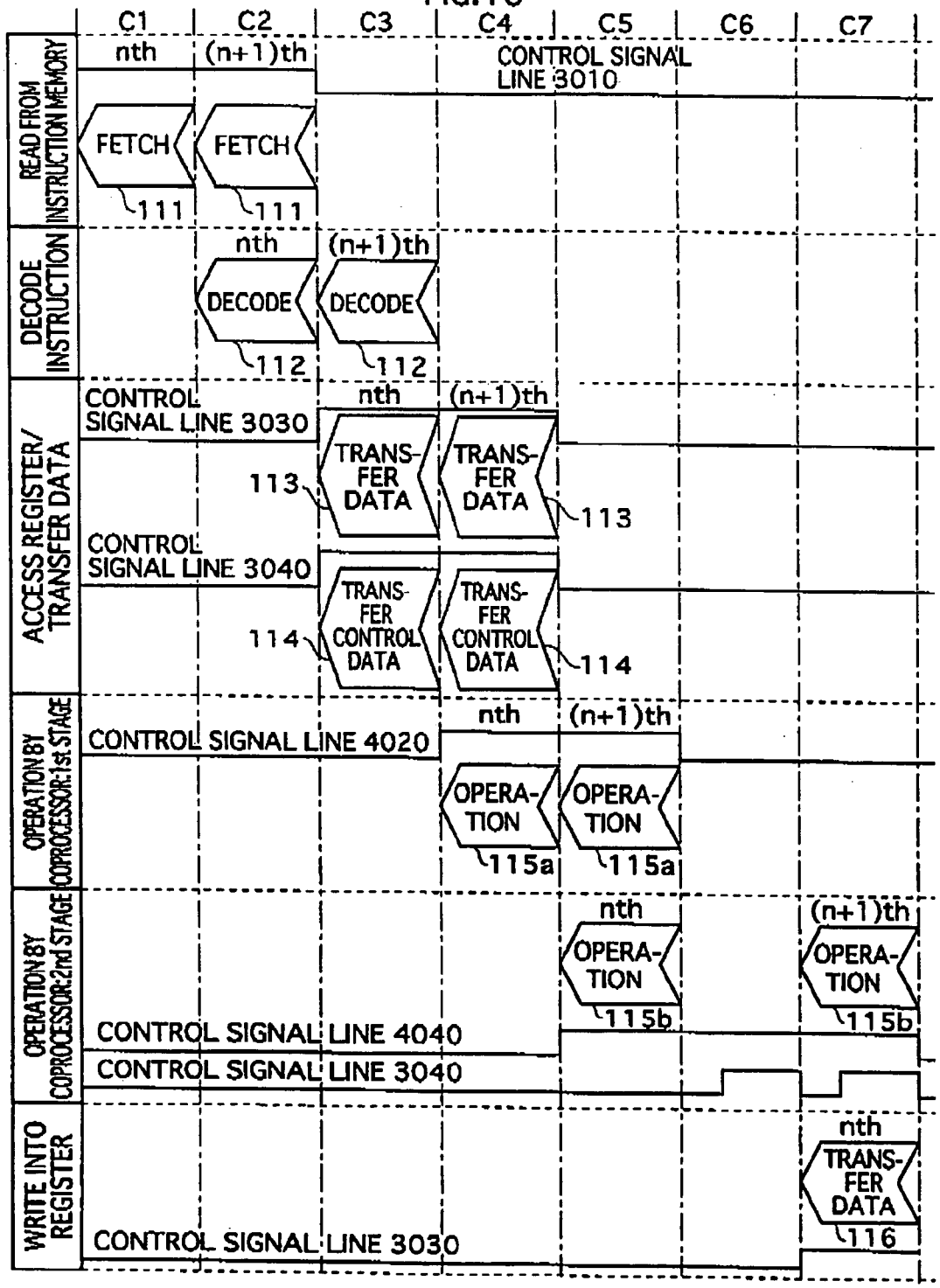
FIG. 10 is a timing chart illustrating, as an example, processes related to a coprocessor operation instruction in the third modification example, in a case where issuance of a signal indicating reception is possible is delayed.

FIGS. 9 and 10 are timing charts each illustrating, as an example, processes related to a coprocessor operation instruction in the third modification example. FIG. 10 illustrates a case where a signal indicating reception is possible is issued later than in a case shown in FIG. 9.

In both of the cases shown in FIGS. 9 and 10, in cycles C1 to C4, the processor system relating to the third modification example operates in the same manner as in the first modification example shown in FIG. 6.

In a cycle C5 in the both cases, a latter-half operation 115*b* of two stages of a coprocessor operation is performed in correspondence with an nth coprocessor operation instruction. At the same time, a former-half operation 115*a* is performed in correspondence with an (n+1) th coprocessor operation instruction. In the latter-half operation 115*b*, the ALU 4200 receives a result of a former-half operation 115*a*, performs a further operation to complete the coprocessor operation, and outputs data obtained as a result of the operation onto the data path 3070. Here, the logical control circuit sends a signal indicating the end of the operation to the main processor via the control signal line 4040, in correspondence with the nth coprocessor operation instruction. This signal includes designation of a register to store the result of the operation which has been kept in, for example, the FIFO buffer. After this, the logical control circuit waits a signal indicating reception is possible to be sent via the control signal line 3040.

According to the case shown in FIG. 9, in the cycle C5, a signal indicating reception is possible is issued for the nth coprocessor operation instruction. Accordingly in a cycle C6, the logical control circuit does not send the signal indicating the end of the operation in correspondence with the nth coprocessor operation instruction. In the cycle C6, the logical control circuit sends a signal indicating the end of an operation in correspondence with the (n+1)th coprocessor operation instruction, and causes the ALU 4200 to perform a latter-half operation 115*b* in correspondence with the (n+1)th coprocessor operation instruction.

On the other hand, in the case shown in FIG. 10, in the cycle C5, the signal indicating reception is possible is not issued for the nth coprocessor operation instruction. Accordingly in the cycle C6, the logical control circuit sends again the signal indicating the end of the operation in correspondence with the nth coprocessor operation instruction, and causes the ALU 4200 to again output the result of the operation in correspondence with the nth coprocessor operation instruction, to the data path 3070. Also, the logical control circuit suspends the start of the latter-half operation 115*b* in correspondence with the (n+1)th coprocessor operation instruction. Here, the signal indicating reception is possible is sent in the cycle C6. Hence, in the cycle C7, the logical control circuit sends a signal indicating the end of the operation, in correspondence with the (n+1)th coprocessor operation instruction. This signal includes designation of a register to store a result of the operation which has been kept in, for example, the FIFO buffer. After this, the logical control circuit waits a signal indicating reception is possible to be sent.

Because of the processes related to a signal indicating reception is possible, the main processor and coprocessor can appropriately operate in cooperation with each other in the processor system relating to the third modification example.

FOURTH MODIFICATION EXAMPLE

The following describes a fourth modification example of the processor system 100 relating to the basic example.

A processor system relating to the fourth modification example has the same functional construction as the processor system relating to the second modification example. However, the operating frequency of the coprocessor is double as high as the operating frequency of the main processor in the fourth modification example.

The ALU in the coprocessor in the processor system relating to the fourth modification example does not have a pipeline construction. Accordingly, the coprocessor does not receive a coprocessor operation instruction until writing a result of an operation in accordance with a previous coprocessor operation instruction into a register in the main processor.

Figure 11:
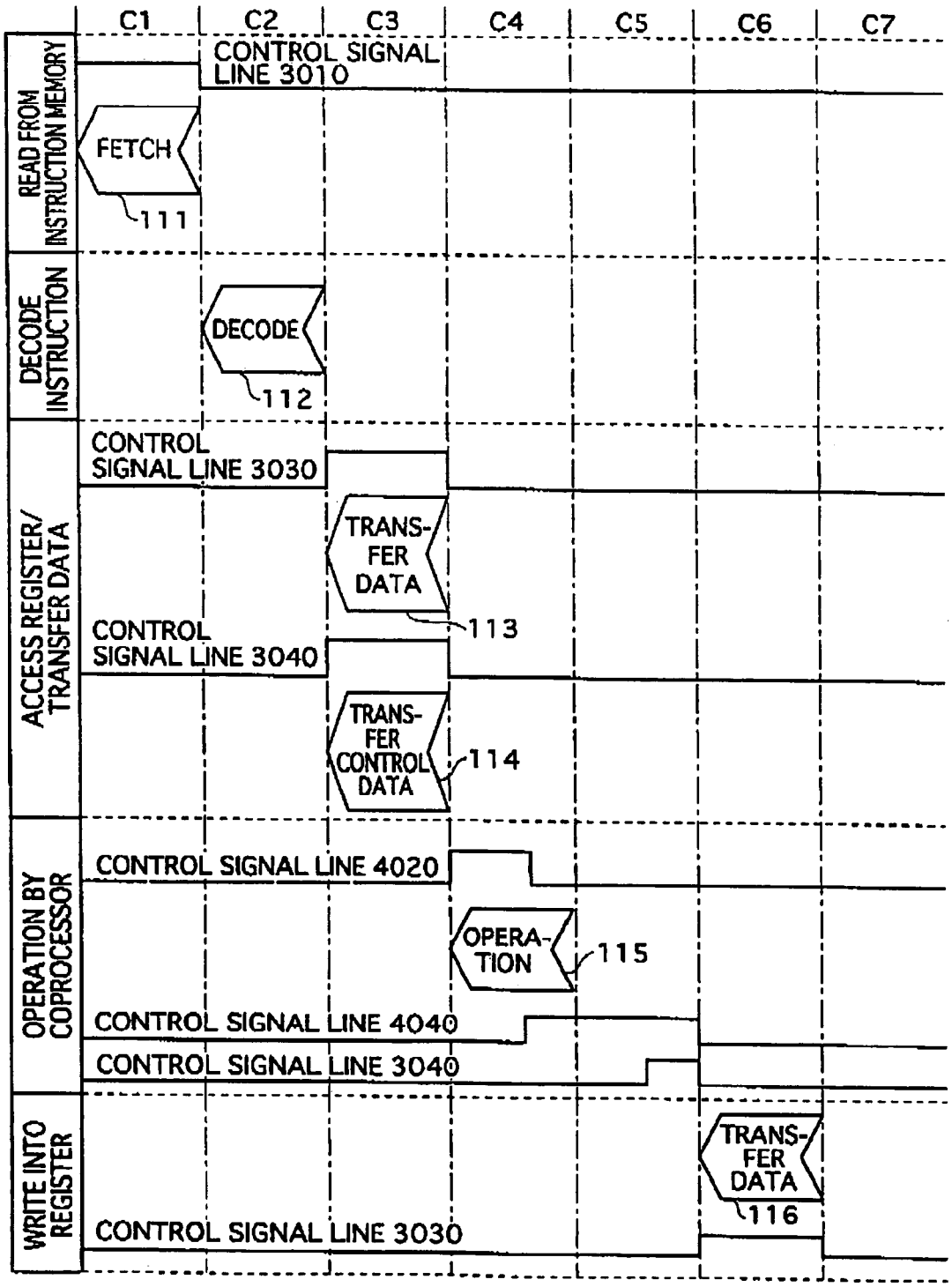
FIG. 11 is a timing chart illustrating processes related to a coprocessor operation instruction in a fourth modification example.

FIG. 11 is a timing chart illustrating processes related to a coprocessor operation instruction in the fourth modification example. FIG. 11 illustrates, as an example, a case where the coprocessor requires one cycle to complete one operation. FIGS. 7 and 11 are different from each other only in terms of time required for a coprocessor operation 115. For this reason, FIG. 11 is not described in detail.

According to the fourth modification example, because of the processes related to a signal indicating reception is possible, the main processor and coprocessor can appropriately operate in cooperation with each other, similarly to the second modification example.

FIFTH MODIFICATION EXAMPLE

The following describes a fifth modification example of the processor system 100 relating to the basic example.

A processor system relating to the fifth modification example has the same functional construction as the processor system relating to the third modification example. However, the operating frequency of the coprocessor is double as high as the operating frequency of the main processor in the fifth modification example.

The ALU in the coprocessor in the processor system relating to the fifth modification example has a pipeline construction. Accordingly, the coprocessor receives a coprocessor operation instruction even before writing a result of an operation in accordance with a previous coprocessor operation instruction into a register in the main processor. The coprocessor performs an operation in a pipeline construction manner with two pipeline stages.

Figure 12:
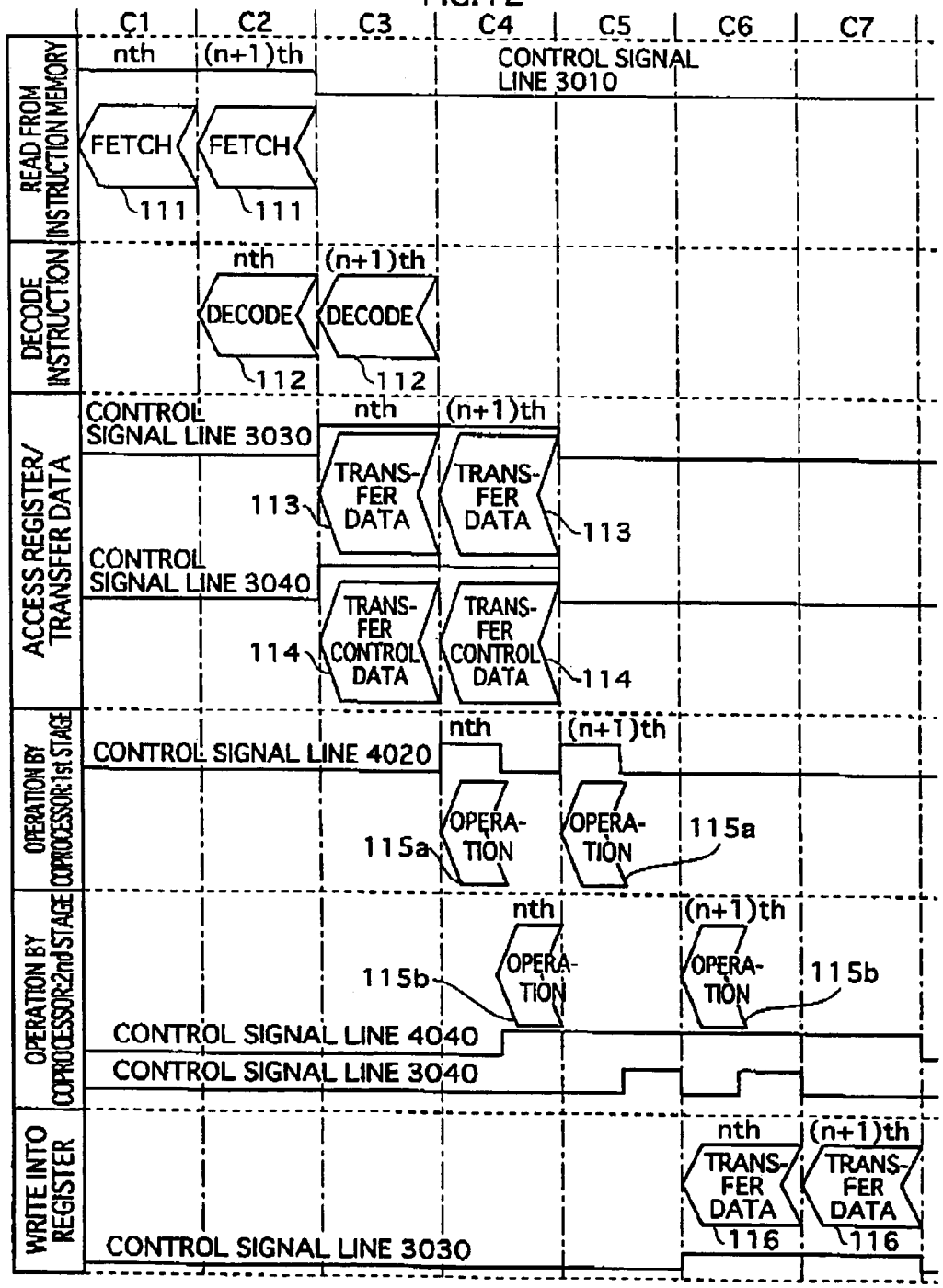
FIG. 12 is a timing chart illustrating processes related to a coprocessor operation instruction in a fifth modification example.

FIG. 12 is a timing chart illustrating processes related to a coprocessor operation instruction in the fifth modification example. FIG. 12 illustrates, as an example, a case where the coprocessor requires one cycle to complete one operation. FIGS. 9 and 12 are different from each other only in terms of time required for a former-half operation 115*a* and a latter-half operation 115*b* of a coprocessor operation. For this reason, FIG. 12 is not described in detail.

According to the fifth modification example, designation of a register to store a result of an operation is held in, for example, a FIFO buffer, and processes related to a signal indicating reception is possible are performed, similarly to the third modification example. Consequently, the main processor and coprocessor can appropriately operate in cooperation with each other.

SIXTH MODIFICATION EXAMPLE

The following describes a sixth modification example of the processor system 100 relating to the basic example.

A processor system relating to the sixth modification example has the same functional construction as the processor system relating to the second modification example. However, the operating frequency of the coprocessor is half the operating frequency of the main processor in the sixth modification example.

To accommodate this difference in operating frequency, the main processor in the processor system relating to the sixth modification example additionally includes a buffer to store a content in a destination register designation field in a coprocessor operation instruction. When decoding a coprocessor operation instruction, the instruction decode control circuit stores a content in a destination register designation field, i.e. designation of a register to store a result of an operation, into the buffer. After this, the main processor prohibits execution of an operation instruction that uses data stored in the designated register, until designation of a register included in a signal indicating an end of an operation sent from the coprocessor coincides with the designation of the register stored in the buffer.

When the coprocessor has a lower operating frequency than the main processor, the following case may occur. The main processor requests the coprocessor to perform an operation in accordance with a coprocessor operation instruction, and writes a result of the operation into a register. However, before the result is written, the main processor may execute a general operation instruction that follows the coprocessor operation instruction, and uses the result of the operation in correspondence with the coprocessor operation instruction.

To avoid this, a special control needs to be performed. According to the processor system relating to the sixth modification example, the main processor stores thereon a content in a destination register designation field of a coprocessor operation instruction. With such a feature, the processor system attains a function of suspending execution of an operation instruction that is subsequent to the coprocessor operation instruction, and uses, to perform an operation, data in the register designated by the content in the destination register designation field of the preceding coprocessor operation instruction. In this way, the subsequent operation instruction is executed after the result of the coprocessor operation instruction is stored into the designated register.

The following describes processes related to execution of a coprocessor operation instruction (a xexec instruction) and a subsequent general operation instruction in the processor system relating to the sixth modification example.

Note that the ALU in the coprocessor does not have a pipeline construction. Accordingly, the coprocessor does not receive a coprocessor operation instruction until a result of an operation in accordance with a previous coprocessor operation instruction is written into a register in the main processor.

Figure 13:
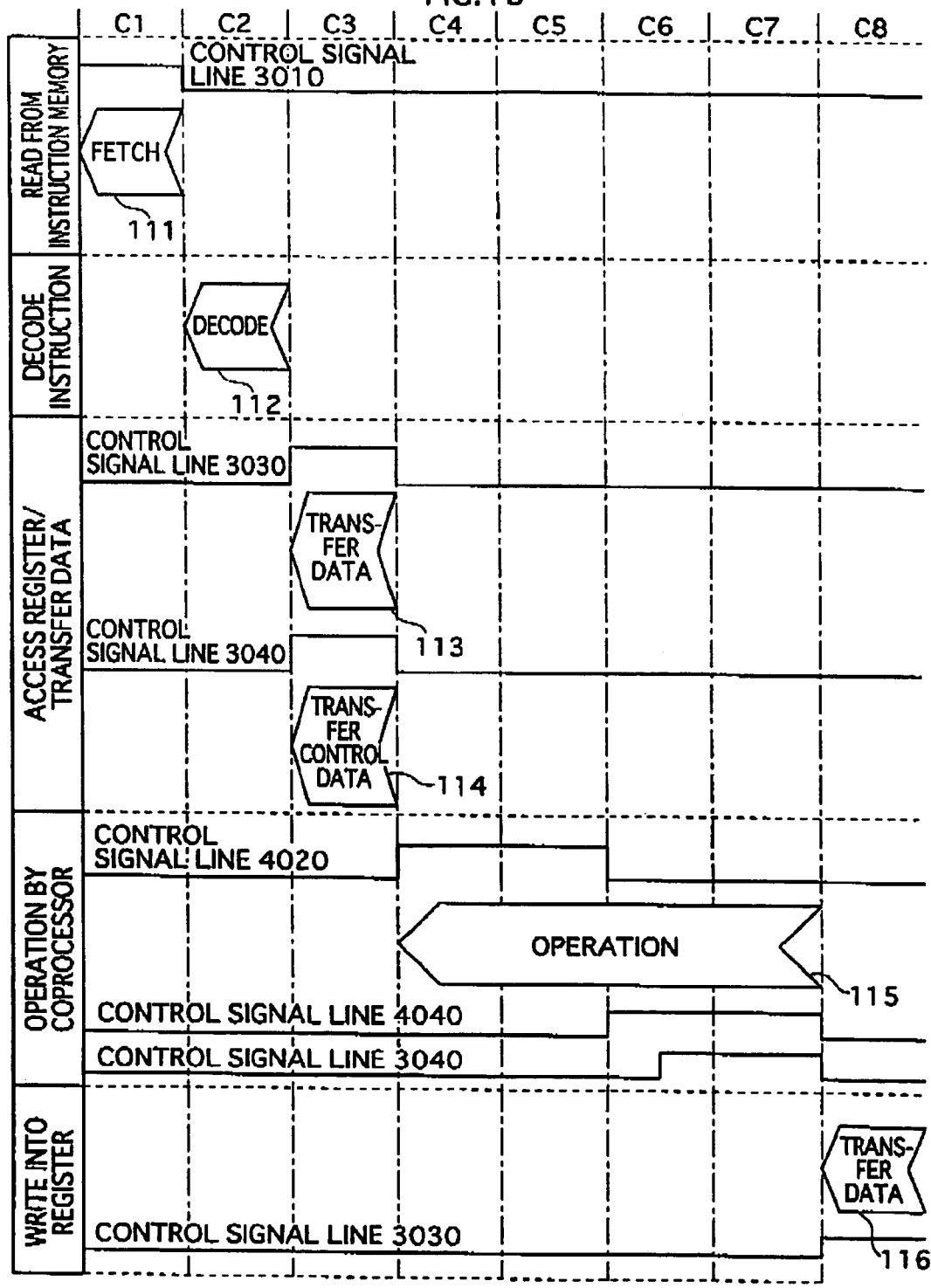
FIG. 13 is a timing chart illustrating processes related to a coprocessor operation instruction in a sixth modification example.

FIG. 13 is a timing chart illustrating processes related to a coprocessor operation instruction in the sixth modification example. FIG. 13 illustrates, as an example, a case where the coprocessor requires four cycles to complete one operation.

In cycles C1 to C3, the processor system relating to the sixth modification example operates in the same manner as the processor system relating to the second modification example shown in FIG. 7. However, it should be noted that the instruction decode control circuit stores, into the buffer, a content in a destination register designation field of a coprocessor operation instruction.

In cycles C4 to C7, a coprocessor operation 115 is performed. Here, the coprocessor operates in units of two cycles. To be specific, in the cycles C4 and C5, the logic control circuit sends a control signal via the control signal line 4020 in the cycle C4 in accordance with an operation type obtained via the control signal line 3040, to cause the ALU 4200 to start performing an operation by using data on the data path 3075. In the cycles C6 and C7, the logical control circuit sends a signal indicating the end of the operation, to the main processor via the control signal line 4040. This signal includes designation of a register to store a result of the operation, which has been received and stored on the logical control circuit. Furthermore, the logical control circuit causes the ALU 4200 to output data obtained as a result of the operation to the data path 3070. Then, the logical control circuit waits a signal indicating reception is possible to be sent via the control signal line 3040.

When receiving the signal indicating the end of the operation, the main processor sends a signal indicating reception is possible to the coprocessor via the control signal line 3040. Here, the main processor sends the signal indicating reception is possible over a time period longer than one cycle, so that the coprocessor having a lower operating frequency can detect the signal indicating reception is possible.

If the logical control circuit receives the signal indicating reception is possible within a time period including the cycles C6 and C7, the logical control circuit does not send the signal indicating the end of the operation in the next cycle.

In the cycle C2, the main processor can execute an instruction data fetch process 111 to fetch an operation instruction subsequent to the coprocessor operation instruction, in addition to decoding the coprocessor operation instruction, although this is not shown in FIG. 13. In the cycle C3, the main processor executes an instruction decoding process 112 for the subsequent operation instruction. Here, suppose a register designated as storing data used to perform an operation in correspondence with the subsequent operation instruction is the same as a register designated to store a result of an operation in correspondence with the preceding coprocessor operation instruction, and the result of the operation in correspondence with the coprocessor operation instruction has not yet been stored into the designated register. If such is the case, the main processor performs a control so that the ALU 3200 does not start performing the operation in correspondence with the subsequent operation instruction until the result of the operation in correspondence with the coprocessor operation instruction is stored into the designated register.

In a cycle C8, a main processor data transfer process 116 is executed. To be specific, the instruction decode control circuit sends a control signal to the register bank 3500 via the control signal line 3030 in accordance with the designation of the register to store the result of the operation included in the received signal indicating the end of the operation. Thus, the instruction decode control circuit causes the designated register to store thereon the data on the data path 3070. After this, the designation of the register held in the buffer is deleted. Subsequently, if there is an operation instruction that is put on hold because the operation instruction is executed by using the data in the designated register, the instruction decode control circuit causes the ALU 3200 to start performing an operation in accordance with the operation instruction.

Second Embodiment

The following describes a processor system relating to a second embodiment of the present invention.

According to the second embodiment, the coprocessor in the processor system performs an operation in a pipeline construction manner, similarly to the first, third and fifth modification examples of the processor system 100 relating to the first embodiment. The processor system relating to the second embodiment has a slightly different construction from the processor system 100 relating to the first embodiment, since it differently uses operands of a coprocessor operation instruction (a xexec instruction).

This following shows a xexec instruction used in the second embodiment in mnemonic codes, which is the same as in the first embodiment.

xexec OPn, dstRn, srcRn

A coprocessor operation instruction, which is a xexec instruction, requires three operands including OPn, dstRn, and srcRn to be designated. The operand OPn designates a type of an operation to be performed by the coprocessor, a nd the operand srcRn designates a number indicating a register in the main processor which stores source data to be used for the operation performed by the coprocessor, as in the first embodiment. However, the operand dstRn does not designate a number indicating a register in the main processor which is to store a result of the operation performed by the coprocessor in correspondence with the coprocessor operation instruction. Alternatively, the operand dstRn designates a number indicating a register in the main processor to store a result of an operation in correspondence with a xexec instruction preceding the coprocessor operation instruction by the number of pipeline stages of the coprocessor, that is to say, a result of an operation which the main processor requests the coprocessor to perform in a cycle preceding by the number of pipeline stages.

When fetching and decoding such a coprocessor operation instruction, the main processor sends a content in a register designated by the operand srcRn, i.e. source data, and the operation type, to the coprocessor, to request the coprocessor to perform an operation. Furthermore, the main processor receives a result of an operation which the main processor requests the coprocessor to perform in a preceding cycle, and stores the result into a register designated by the operand dstRn.

Here, the format of a coprocessor operation instruction (an xexec instruction) is the same as the format described in the first embodiment with reference to FIG. 2.

The processor system relating to the second embodiment basically has the same construction and performs the same operation as the processor system 100 relating to the first embodiment (see FIGS. 3 and 4) Therefore, the following description of the second embodiment is made with a focus on its differences from the first embodiment.

The instruction decode control circuit in the main processor decodes an instruction read from the instruction memory. When judging the instruction is a xexec instruction according to an instruction identification code, the instruction decode control circuit executes the following three processes in one cycle based on the contents in the fields (see FIG. 2) designating the operands of the instruction.

As the first one of the processes, the instruction decode control circuit sends a content in a coprocessor operation code field, i.e. an operation type, to the logical control circuit in the coprocessor via the control signal line 3040. Here, the instruction decode control circuit does not send a content in a destination register designation field. Accordingly, the logical control circuit is not configured to store a content in a destination register designation field.

As the second one of the processes, the instruction decode control circuit sends a control signal to the register bank 3500 via the control signal line 3030, so as to cause a register designated by a content in a source register designation field to output data to the data path 3075.

The logical control circuit in the coprocessor controls data transfer to the register bank 4500, and controls the ALU 4200 to perform a specific operation, in accordance with the designation of the operation type sent from the main processor. When the operation is completed, however, the logical control circuit does not send a signal indicating the end of the operation to the main processor. Therefore, the control signal line 4040 is no longer necessary. When completing the operation, the ALU 4200 outputs data obtained as a result of the operation, to the transmission channel 3070.

As the third one of the processes, the instruction decode control circuit sends a control signal to a register designated by a content in a destination register designation field of the xexec instruction and the selectors 3650 to 3665 via the control signal line 3030, so as to cause the register to store thereon data on the data path 3070. By doing so, the register in the main processor stores a result of an operation performed by the coprocessor in correspondence with a xexec instruction which the main processor decodes in a cycle several cycles before decoding this xexec instruction.

Here, the instruction decode control circuit is only required to write data into one register in one cycle. Accordingly, it is not particularly necessary to adjust (i) a data transfer period during which a result of an operation performed by the coprocessor in correspondence with a xexec instruction is written into a register, and (ii) a data transfer period during which a result of an operation performed by the internal ALU in correspondence with a general operation instruction is written into a different register.

The instruction decode control circuit does not send a signal indicating reception is possible via the control signal line 3040, differently from some of the modification examples of the first embodiment. Therefore, the coprocessor does not perform a control to wait a signal indicating reception is possible to be sent.

Suppose a program stored in the instruction memory has a lot of continuous coprocessor operation instructions. According to the method used in the processor system relating to the second embodiment, neither the main processor nor coprocessor needs a mechanism to store a content in a destination register designation field of each of the coprocessor operation instructions in order to appropriately operate.

Here, a register to store destination data which is designated by an operand in a coprocessor operation instruction in the program stores thereon a valid value, only when there is a coprocessor operation instruction prior to this coprocessor operation instruction, and a result of an operation performed by the coprocessor in correspondence with the preceding coprocessor operation instruction is output on the data path 3070. Taking this into consideration, a programmer needs to know the number of cycles required for the coprocessor to complete one operation, when manually writing the program, for example.

Third Embodiment

The following describes an object code generating apparatus relating to a third embodiment of the present invention.

The object code generating apparatus relating to the third embodiment is a compiler, and realized by using a computer and software. The object code generating apparatus is an instruction sequence generating apparatus for generating object code based on source code. Here, the object code is a program including an instruction sequence to be executed by the processor system 100 relating to the first embodiment, and the source code is written in a high-level language.

Figure 14:
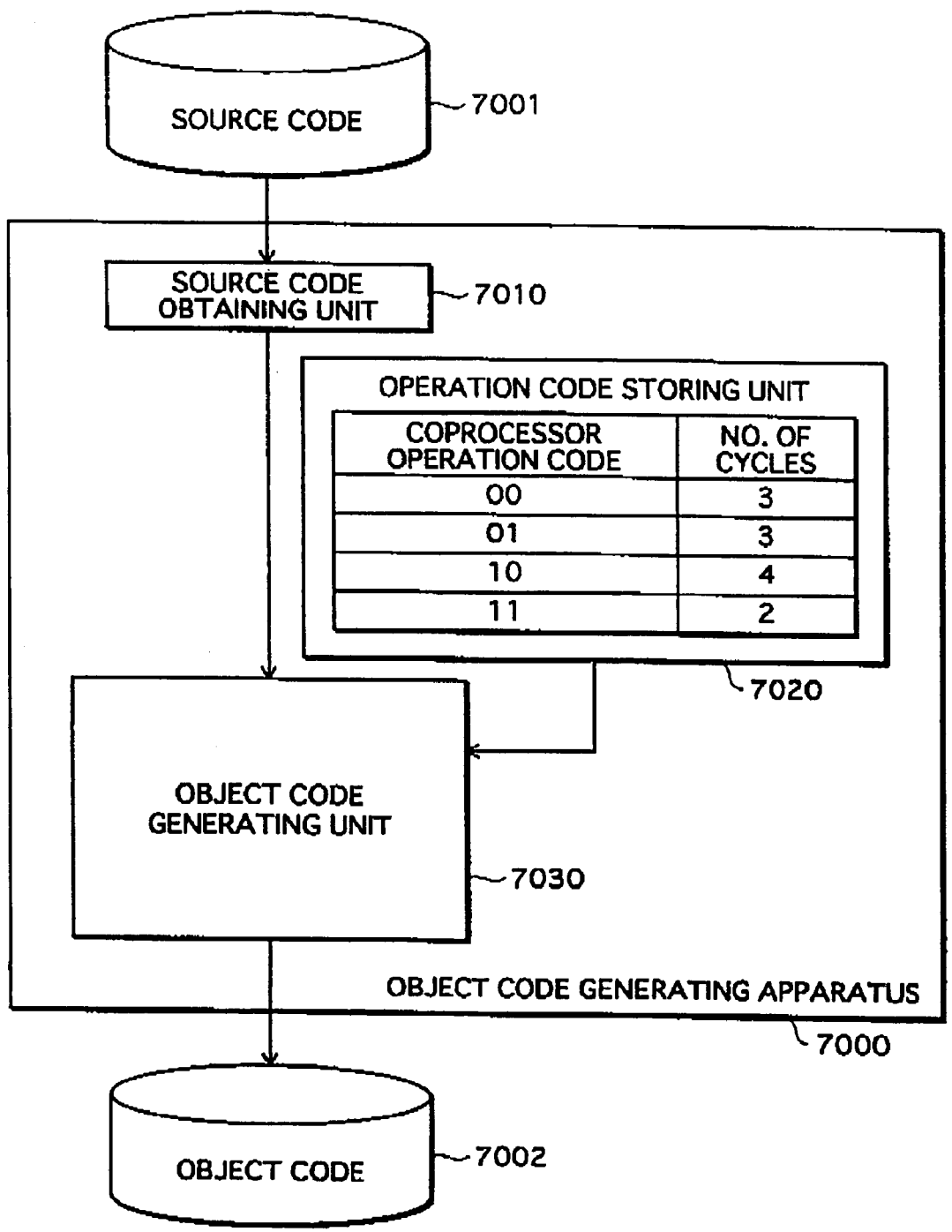
FIG. 14 is a block diagram illustrating a construction of an object code generating apparatus relating to a third embodiment.

FIG. 14 is a block diagram illustrating a construction of the object code generating apparatus relating to the third embodiment. FIG. 14 also illustrates source code 7001, and object code 7002.

As shown in FIG. 14, an object code generating apparatus 7000 includes a source code obtaining unit 7010, an operation code storing unit 7020, and an object code generating unit 7030, from a viewpoint of functions.

The source code obtaining unit 7010 has a function of reading, into a memory, the source code 7001 recorded on a hard disk device or the like, so as to refer to the source code 7001.

The operation code storing unit 7020 stores thereon information relating to all of the operation codes included in an instruction set for a main processor in a processor system in which the object code 7002 is to be executed. Furthermore, the operation code storing unit 7020 stores thereon cycle information indicating the number of cycles required for a coprocessor to complete an operation, for each operation type, that is to say, for each coprocessor operation code, for coprocessor operation instructions. The information relating to all of the operation codes includes information necessary to generate a coprocessor operation instruction having the format shown in FIG. 2, and information defining a function to indicate a coprocessor operation instruction in a high-level language.

The object code generating unit 7030 refers to the source code 7001 through the source code obtaining unit 7010. Similarly to a general compiler, the object code generating unit 7030 converts the statements in the source code 7001 into an instruction sequence, based on the information relating to the operation codes. In addition, differently from a general compiler, the object code generating unit 7030 specifies the number of cycles of a time period from when each coprocessor operation instruction is decoded to when a result of an operation performed by the coprocessor in correspondence with the coprocessor operation instruction is stored into a register to store destination data which is designated by an operand of the coprocessor operation instruction, according to the above-mentioned cycle information. Based on the specified number of cycles, the object code generating unit 7030 adjusts the order of instructions in the instruction sequence obtained by the conversion, to prevent a content in the designated register from being used to execute a different instruction before the specified number of cycles elapse.

Figure 15:
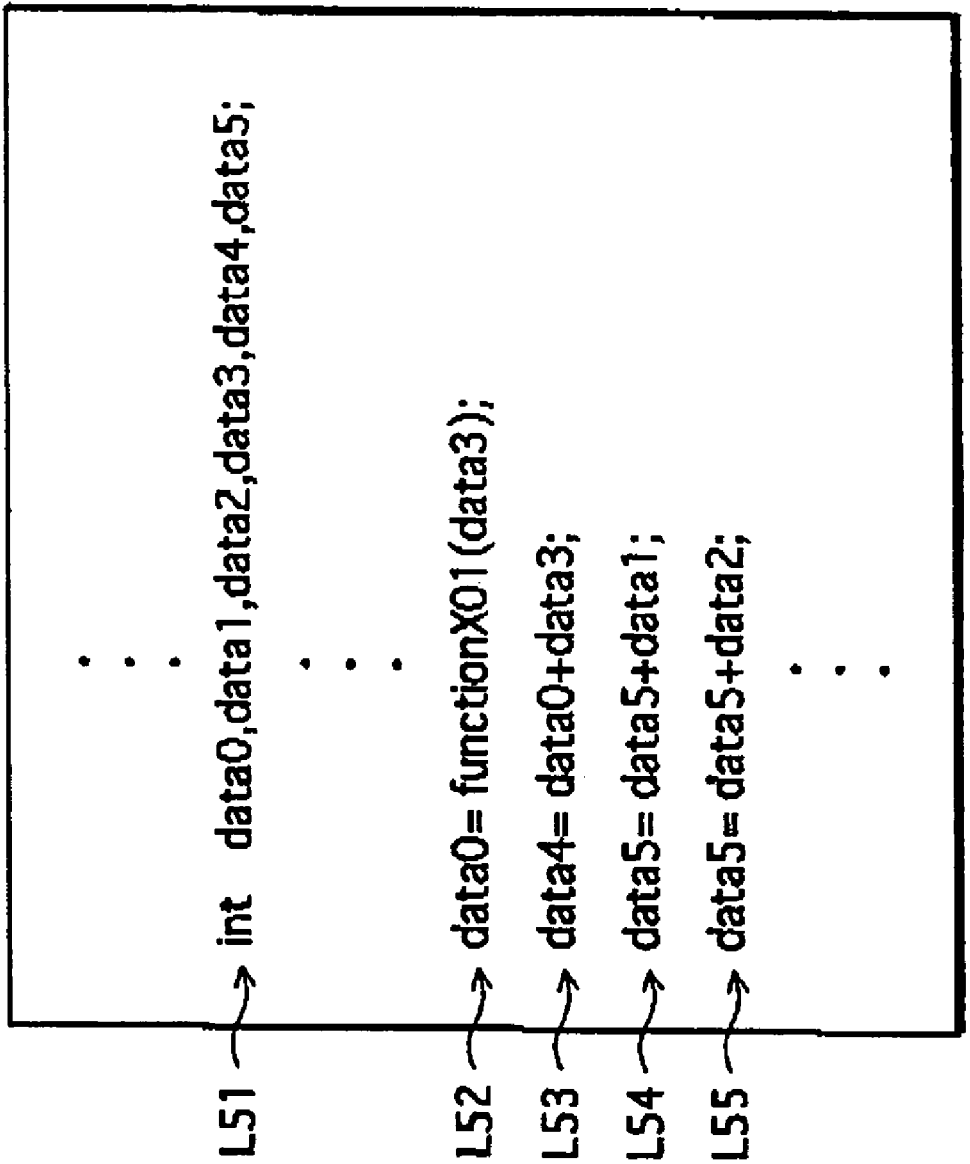
FIG. 15 illustrates an example of source code.

FIG. 15 illustrates an example of the source code 7001, which is written in the C language.

A line L51 declares variables from data 0 to data 5. A line L52 indicates that the data 0 is a result of an operation performed by calling a function X01 preset for a coprocessor operation, with the data 3 as an argument.

A line L53 indicates that the data 4 is equal to the sum of the data 0 and data 3. A line L54 indicates the data 5 is equal to the sum of the data 5 and data 1. A line L55 indicates the data 5 is equal to the sum of the data 5 and data 2.

Figure 16:
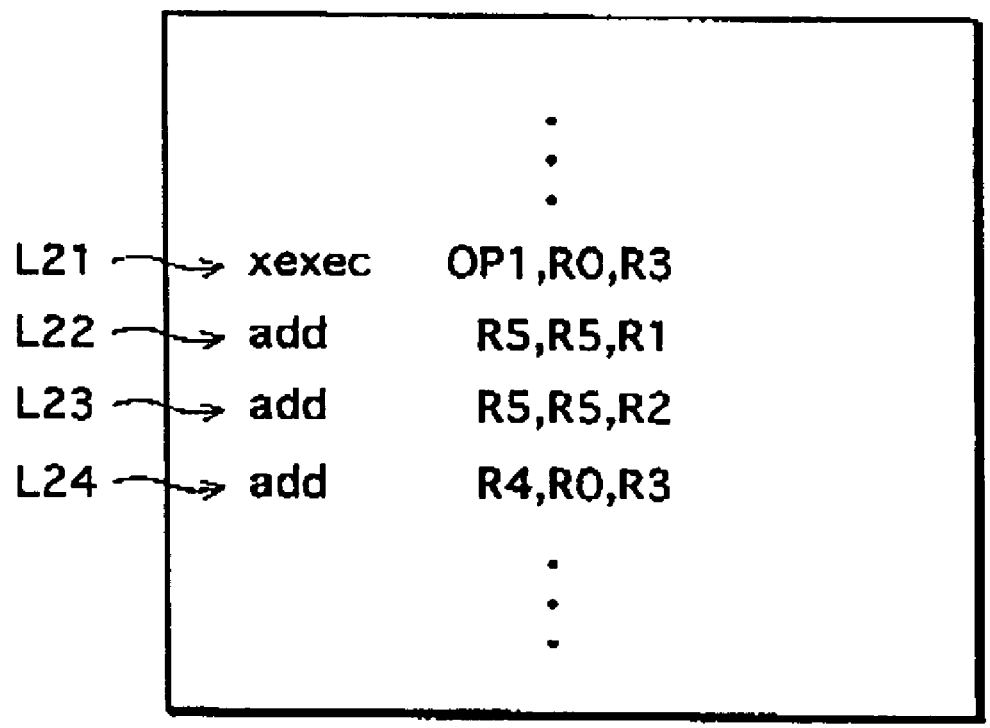
FIG. 16 illustrates an example of object code generated based on the source code illustrated in FIG. 15.
Figure 17:
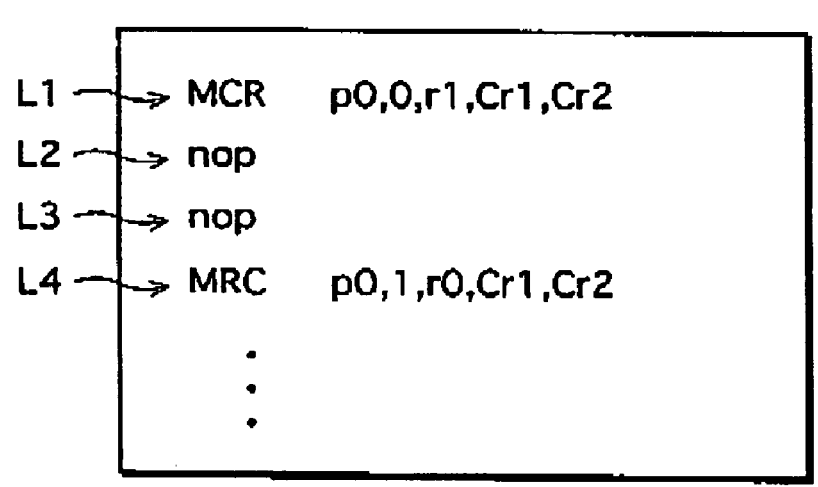
FIG. 17 illustrates an example of a program to cause a coprocessor to perform an operation.

FIG. 16 illustrates an example of the object code 7002 generated based on the source code 7001 shown in FIG. 15. For better intelligibility, the object code 7002 is expressed in mnemonic codes. Here, an add instruction including first to third operands indicates that a result of adding together a content in a register designated by the second operand and a content in a register designated by the third operand is stored into a register designated by the first operand.

According to the example shown in FIG. 16, the variables data 0 to data 5 are respectively assigned to registers R0 to R5. The object code generating apparatus 7000, generates a line L21, by converting the function X01 of the line L52 in the source code 7001 into a coprocessor operation instruction having a coprocessor operation code of OP01. The xexec instruction in the line L21 designates an operation code OP01 as a type of an operation to be performed by the coprocessor, a register R3 as a register in the main processor storing source data to be used for the operation by the coprocessor, and a register R0 as a register in the main processor to store a result of the operation by the coprocessor.

In other words, when detecting a function X01 in source code, the object code generating apparatus 7000 converts the function X01 into a xexec instruction having a coprocessor operation code of OP01. The object code generating apparatus 7000 converts a register assigned to a variable which is an argument of this function, into an operand designating a register in the main processor storing source data. The object code generating apparatus 7000 converts a register assigned to a variable which is a return value of this function, into an operand designating a register in the main processor to store a result of the operation by the coprocessor.

It is assumed that an operation corresponding to the coprocessor operation code of OP01 requires three cycles (see FIG. 14). Here, an add instruction "add R4, R0, R3" corresponding to the line L53 in the source code 7001 is supposed to be generated next to the line L21. However, the result of the operation in correspondence with the coprocessor operation instruction is not stored into the register R0 until three cycles elapse. Therefore, this add instruction is generated in a line L24, and instructions corresponding to the lines L54 and L55 in FIG. 15 are respectively generated in lines L22 and L23.

In this way, with the object code generating apparatus 7000, a programmer, who writes source code, can obtain appropriate object code, without the necessity of taking into consideration the number of cycles required by the coprocessor to complete an operation in correspondence with a coprocessor operation instruction. As for the example shown in FIG. 15, the statements in the lines L54 and L55 are executed prior to the statement in the line L53. In some cases, however, such a change in statement order may not be possible due to a relation between pieces of data or the like. If such is the case, the object code generating apparatus 7000 inserts a necessary number of nop instructions between a coprocessor operation instruction and an operation instruction that is executed by using a result of an operation in correspondence with the coprocessor operation instruction. In this way, the object code generating apparatus 7000 can prevent the operation instruction from being executed before the result of the operation in correspondence with the coprocessor operation instruction is stored.

MODIFICATIONS

The present invention is not limited to the above-described embodiments. The processor systems and object code generating apparatus relating to the embodiments of the present invention can be partly modified as explained in the following.

(1) According to the first embodiment, the main processor 3000 sends a content in a destination register designation field of a coprocessor operation instruction to the coprocessor 4000, and the coprocessor 4000 holds the content when completing an operation, the coprocessor 4000 sends a signal indicating the end of the operation which includes the content, to the main processor 3000. However, the main processor 3000 may not send the content in the destination register designation field of the coprocessor operation instruction to the coprocessor 4000, but stores thereon the content. In this case, when receiving the signal indicating the end of the operation and a result of the operation in correspondence with the coprocessor operation instruction from the coprocessor 4000, the main processor 3000 may store the received result of the operation to a register designated by the content stored thereon. Here, the main processor may keep the content in the destination register designation field in a FIFO buffer, for example.

Furthermore, the coprocessor 4000 may not send the signal indicating the end of the operation. If this is the case, the instruction decode control circuit 3100 in the main processor 3000 stores thereon, for each operation type, a time until when the coprocessor 4000 sends a result of an operation in correspondence with a coprocessor operation instruction. With such a construction, The instruction decode control circuit 3100 counts the number of cycles in order to detect a timing of receiving the result of the operation from the coprocessor 4000, and stores the received result into the register designated by the content stored thereon. Here, the instruction decode control circuit 3100 may perform the following control in relation to the counting. The instruction decode control circuit 3100 sets a counted value appropriately depending on the type of the operation in correspondence with the coprocessor operation instruction, when decoding the coprocessor operation instruction. The instruction decode control circuit 3100 decreases the counted value by one every time one cycle elapses. When the counted value becomes, for example, zero, the instruction decode control circuit 3100 writes the data on the data path 3070 into the register.

Here, several factors need to be taken into consideration in the designing process of the processor system 100, in order that the instruction decode control circuit 3100 stores thereon the number of cycles from when the instruction decode control circuit 3100 decodes a coprocessor operation instruction until when the coprocessor 4000 outputs a result of an operation to the data path 3070, in association with an operation type which is a content in a coprocessor operation code field of a coprocessor operation instruction. Such factors include the number of cycles required for data in a register in the main processor 3000 to reach the ALU 4200 in the coprocessor 4000, the number of cycles required by the ALU 4200 in the coprocessor 4000 to perform each type of operation, and the number of cycles required for a result of an operation sent from the ALU 4200 in the coprocessor 4000 to reach the register bank 3500 in the main processor 3000.

(2) According to the fifth modification example of the first embodiment, the operating frequency of the coprocessor is double as high as that of the main processor. Alternatively, the operating frequency of the coprocessor may be four times as high, for example. According to the sixth modification example of the first embodiment, the operating frequency of the coprocessor is half that of the main processor. However, the operating frequency of the coprocessor may be quarter, for example.

(3) According to the first and second embodiments, the instruction decode control circuit sends an operation type, which is a content in a coprocessor operation code field of a coprocessor operation instruction, to the logical control circuit in the coprocessor. Thus, the operation type is decoded by the logical control circuit in the coprocessor. As an alternative example, the content in the coprocessor operation code field may be decoded by the instruction decode control circuit. Thus, the instruction decode control circuit identifies the operation, and sends a signal indicating the identified operation to the logical control circuit. The logical control circuit causes the ALU 4200 to perform the operation specified by the signal.

(4) According to the first to third embodiments, a coprocessor operation instruction designates one register as storing source data and one register to store destination data. Alternatively, a plurality of registers may be designated. In this case, a plurality of data paths are provided for data transfer from the main processor to the coprocessor and for data transfer from the coprocessor to the main processor, and the processor system performs an appropriate data transfer control.

(5) In the first embodiment, the processes related to a coprocessor operation instruction, which are described with reference to FIGS. 5 to 13, include an instruction data fetch process, an instruction decoding process, and a coprocessor data transfer process. It is not necessary to execute each of these processes in one cycle. As an alternative example, an instruction data fetch process and an instruction decoding process may be executed in one cycle.

(6) According to the first and second embodiments, the coprocessor does not directly access the instruction memory 5000 and data memory 6000. However, an exclusive bus and an instruction may be provided so that the coprocessor can directly access the memories 5000 and 6000.

Figure 18:
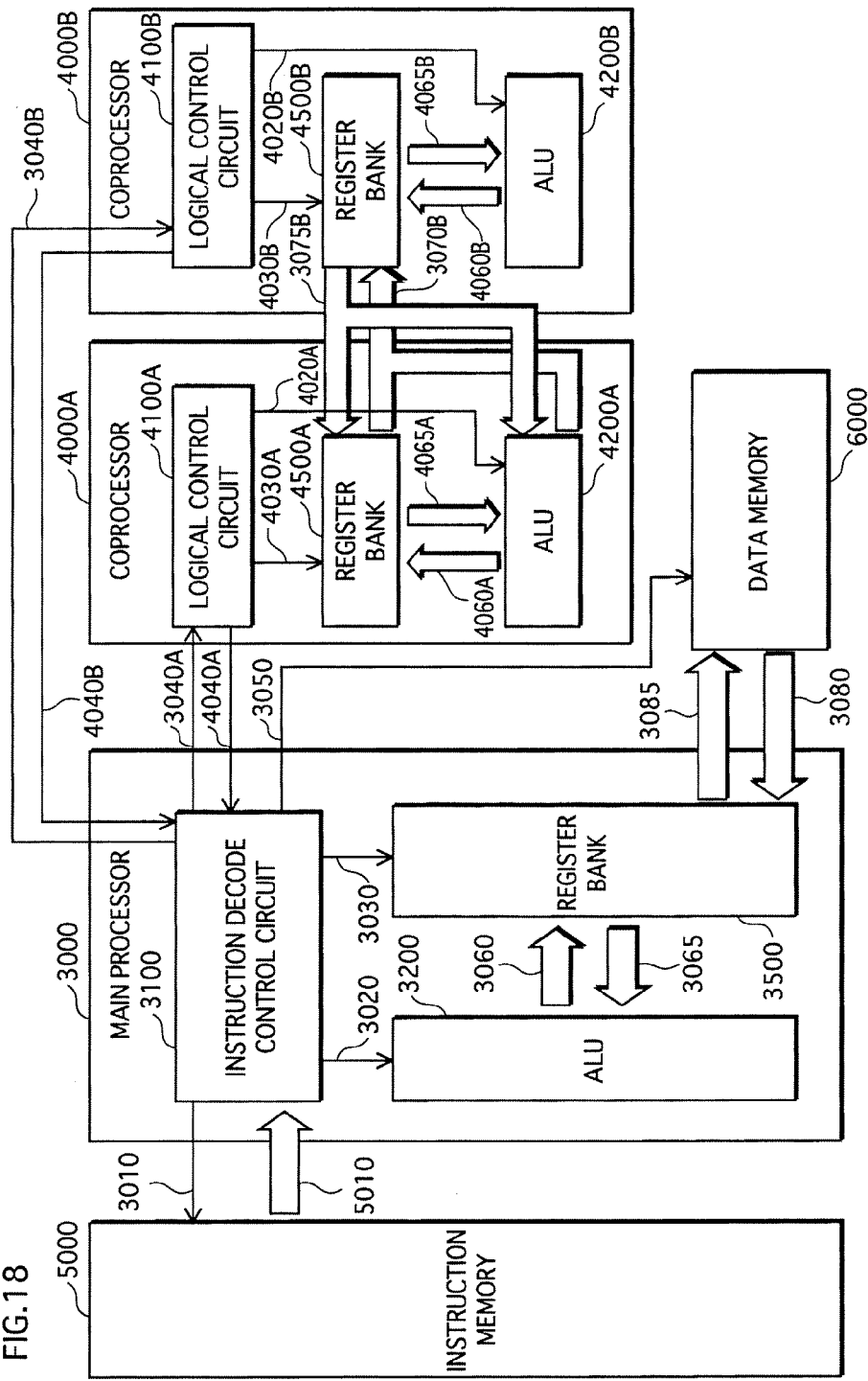
FIG. 18 illustrates a processor system relating to a second embodiment.

(7) according to the first and second embodiments, a register storing source data and a register to store destination data, which are designated by a coprocessor operation instruction, are both included in the main processor. However, the processor system may include a plurality of coprocessors, and a coprocessor operation instruction to cause a coprocessor A to perform an operation may designate registers in a different coprocessor B as a register storing source data and a register to store destination data. In this case, the instruction decode control circuit in the main processor controls the register bank in the coprocessor B in the same manner as controlling the register bank 3500, based on a coprocessor instruction. Here, the register bank in the coprocessor B may be controlled by a logical control circuit in the coprocessor B, in response to an instruction from the instruction decode control circuit. This can be seen in FIG. 18 with coprocessor A depicted as 4000A and coprocessor B depicted as 4000B. The Logical Control Circuit 4100A, the Register Bank 4500A, and the ALU 4200A of coprocessor A are identical to the Logical Control Circuit 4100B, the Register Bank 4500B, and the ALU 4200B of coprocessor B respectively.

(8) According to some of the modification examples of the first embodiment, when the main processor is ready to receive a result of an operation performed by the coprocessor, the main processor sends a signal indicating reception is possible. Instead of this signal, the main processor may send a signal indicating writing is completed immediately after completing writing a result of an operation performed by the coprocessor into a register. Here, the coprocessor continues outputting the result of the operation to the data path 3070 until receiving the signal indicating writing is completed, (9) The processor system including the main processor and coprocessor relating to each of the first and second embodiments may be formed, as a semiconductor integrated circuit, on one semiconductor chip. This semiconductor integrated circuit may further include the instruction memory, or the instruction memory and data memory.

(10) According to the third embodiment, the object code generating apparatus 7000 is a compiler, which generates object code based on source code written in a high-level language such as the C language. Alternatively, the object code generating apparatus 7000 may be an assembler, an assembler optimizer, or the like. Furthermore, the source code may include an instruction sequence corresponding to an instruction set executable on the processor system 100 relating to the first embodiment. In this case, the object code generating apparatus 7000 may change the order of statements in the source code, to generate object code in which an operation instruction to be executed by using data generated by a coprocessor operation instruction is positioned so as to be executed after the data generated as a result of the coprocessor operation instruction has been stored.

Here, a program that is executable on the processor system relating to the second embodiment and includes a coprocessor operation instruction may be generated by a programmer manually writing the program, or by using the object code generating apparatus 7000 relating to the third embodiment without a function of changing the order of instructions in connection with a coprocessor operation instruction.

(11) According to the third embodiment, the operation code storing unit 7020 in the object code generating apparatus 7000 stores the cycle information. This cycle information can be replaced with cycle information corresponding to a different coprocessor. In this way, when a different coprocessor is selected in the processor system 100, the object code generating apparatus 7000 can generate appropriate object code.

(12) According to the third embodiment, the object code generating apparatus 7000 generates object code including a coprocessor operation instruction that designates registers in the main processor as a register storing source data and as a register to store destination data. However, the present invention is not limited to such. The object code generating apparatus 7000 may generate object code appropriate for a processor system including a plurality of coprocessors. Such object code includes a coprocessor operation instruction to cause a coprocessor A to perform an operation, and this coprocessor operation instruction designates registers in a different coprocessor B as a register storing source data and a register to store destination data.

(13) According to the third embodiment, the object code generating apparatus 7000 generates the object code 7002 based on the information stored on the operation code storing unit 7020 and source code 7001. A computer program defining this generating operation may be distributed, in the form of being stored on a storage medium or via a variety of communication networks. Such a storage medium may be a flash memory, an IC card, an optical disc, a flexible disc, a ROM, or the like. When distributed, the computer program may be stored in a computer-readable memory or the like, to be used. In detail, a computer executes the computer program, to realize functions of the object code generating apparatus 7000 relating to the third embodiment.

(14) The ALU 4200 in the coprocessor described in the first and second embodiments may include a plurality of operation units and a selector, and the operation units perform operations such as addition, subtraction, and multiplication. Here, the coprocessor may be configured so as to be able to dynamically determine the type of an operation to be performed by the ALU 4200, in response to an instruction for the coprocessor or setting of the registers. Furthermore, the operation units may be connected to each other, so that any one of the operation units can receive a content in a register in the main processor or coprocessor, and a result of an operation performed by a different one of the operation units, via the selector. In this case, the operation unit to receive such data may be dynamically changed in response to an instruction for the coprocessor, or setting of the registers.

(15) The processor systems relating to the first and second embodiments may include a plurality of coprocessors, one of which is the coprocessor 4000. The source data for the ALU 4200 is not limited to data output from a register in the main processor, but may be data output from a register in the coprocessor 4000, or data output from a register in a different coprocessor. Alternatively, the source data for the ALU 4200 may be dynamically switched over between these pieces of data in response to an instruction for the coprocessor, or setting of the registers.

The ALU 4200 in the coprocessor performs operations such as addition, subtraction, and multiplication, and the type of an operation to be performed by the ALU 4200 can be dynamically determined, in response to an instruction for the coprocessor or setting of the registers. In addition, the logical control circuit 4100 in the coprocessor may be configured to be able to dynamically change the format of a coprocessor operation instruction and the like, in response to a special instruction or setting of the registers. Which is to say, the logical control circuit 4100 may be configured to be able to dynamically change the number of bits assigned to each of an operation code, a source location, a destination location, an operation type and the like.

What is claimed is:

1. A processor system including a main processor performing an operation according to an operation instruction and a coprocessor, the main processor comprising:

a plurality of registers to store data used for the operation and data obtained as a result of the operation; and an instruction decode control unit sequentially decoding instructions, and sending control signals in accordance with each of the instructions, wherein when decoding a request instruction designating (i) a type of operation to be performed by a coprocessor, (ii) a first data that specifies one of the plurality of registers as a first storage area to store data to be used to perform the operation of a designated type, and (iii) a second data that specifies one of the plurality of registers as a second storage area to store data obtained as a result of the operation of the designated type performed by the coprocessor, the request instruction including (i) a field storing an instruction identification code to distingnish the request instruction from other types of instructions included in all instructions executable on the main processor, (ii) a field storing a coprocessor operation code specifing the type of the operation to be performed by the coprocessor, (iii) a field storing the first data, and (iv) a field storing the second data, the instruction decode control unit prestores thereon time information indicating a time period required to complete the operation of the designated type and sends control signals (i) to send the coprocessor operation code included in the request instruction to the coprocessor, (ii) to send to the coprocessor, source data which is the data stored in the register specified by the first data included in the request instruction, and (iii) to write into the register specified by the second data included in the request instruction, resulting data obtained as a result of the operation of the designated type which is sent from the coprocessor when a time period indicated by time information corresponding to the type specified by the coprocessor operation code in the request instruction has elapsed after sending the coprocessor operation code and source data in the request instruction to the coprocessor, the coprocessor (i) decodes the coprocessor operation code sent from the main processor, (ii) performs the operation of the designated type of which is specified by the coprocessor operation code, by using the source data sent from the main processor, and (iii) sends resulting data which is data obtained as a result of the same operation to the main processor.

2. A processor system including a main processor performing an operation according to an operation instruction and a coprocessor, the main processor comprising:

a plurality of registers to store data used for the operation and data obtained as a result of the operation; and an instruction decode control unit sequentially decoding instructions, and sending control signals in accordance with each of the instructions, wherein when decoding a request instruction designating (i) a type of operation to be performed by a coprocessor, (ii) a first data that specifies one of the plurality of registers as a first storage area to store data to be used to perform the operation of a designated type, and (iii) a second data that specifies one of the plurality of registers as a second storage area to store data obtained as a result of the operation of the designated type performed by the coprocessor, the request instruction including (i) a field storing an instruction identification code to distinguish the request instruction from other types of instructions included in all instructions executable on the main processor, (ii) a field storing a coprocessor operation code specifying the type of the operation to be performed by the coprocessor, (iii) a field storing the first data, and (iv) a field storing the second data, the instruction decode control unit sends control signals (i) to send the coprocessor operation code included in the request instruction to the coprocessor (ii) to send to the coprocessor, source data which is the data stored in the register specified by the first data included in the request instruction, and (iii) to write resulting data which is the data obtained as a result of the operation of the designated type sent from the coprocessor into the register specified by the second data included in the request instruction, the coprocessor (i) decodes the coprocessor operation code sent from the main processor, (ii) performs the operation of the designated type of which is specified by the coprocessor operation code, by using the source data sent from the main processor, and (iii) sends resulting data which is data obtained as a result of the same operation to the main processor, and further wherein for an operation of any type, the coprocessor outputs resulting data which is sent from the coprocessor, and obtained as a result of an operation designated by a different request instruction that is decoded prior to the request instruction and that is controlled, by the instruction decode control unit, to be written into the register specified by the second data included in the request instruction when a same time period elapses since a start of the operation, and after sending the coprocessor operation code included in the request instruction to the coprocessor, but before decoding a different instruction subsequently to the request instruction, the instruction decode control unit sends control signals to write the resulting data sent from the coprocessor as a result of the operation designated by the different request instruction that is decoded prior to the request instruction, into the register specified by the second data included in the request instruction.

3. An instruction sequence generating apparatus for generating, based on input data, an instruction sequence written in a machine language to be executed on a main processor included in a processor system together with a coprocessor, the main processor comprising:

a plurality of registers to store data used for the operation and data obtained as a result of the operation; and an instruction decode control unit sequentially decoding instructions, and sending control signals in accordance with each of the instructions, wherein when decoding a request instruction designating (i) a type of operation to be performed by a corocessor, (ii) a first data that specifies one of the plurality of registers as a first storage area to store data to be used to perform the operation of a designated type, and (iii) a second data that specifies one of the plurality of registers as a second storage area to store data obtained as a result of the operation of the designated type performed by the coprocessor, the request instruction including (i) a field storing an instruction identification code to distinguish the recluest instruction from other types of instructions included in all instructions executable on the main processor, (ii) a field storing a coprocessor operation code specifying the type of the operation to be performed by the coprocessor, (iii) a field storing the first data, and (iv) a field storing the second data, the instruction decode control unit sends control signals (i) to send the coprocessor operation code included in the reciuest instruction to the coprocessor, (ii) to send to the coprocessor, source data which is the data stored in the register specified by the first data included in the request instruction, (iii) to write resulting data which is the data obtained as a result of the operation of the designated type sent from the coprocessor into the register specified by the second data included in the request instruction, and (iv) to send to the coprocessor, the second data included in the request instruction to the coprocessor, the coprocessor (i) decodes the coprocessor operation code sent from the main processor, (ii) performs the operation of the designated type of which is specified by the coprocessor operation code, by using the source data sent from the main processor, (iii) sends resulting data which is data obtained as a result of the same operation to the main processor, and (iv) sends back to the main processor the second data that has been sent from the main processor, together with the coprocessor operation code, and the instruction decode control unit receives the resulting data and the second data sent from the coprocessor, and writes the received resulting data into the register specified by the received second data, and the instruction sequence generating apparatus comprising:

a storing unit;

an obtaining unit to obtain the input data; and an instruction sequence generating unit generating the instruction sequence written in the machine language based on the input data, and store the instruction sequence into the storing unit, the instruction sequence including a request instruction designating (i) a type of an operation to be performed by the coprocessor, (ii) a first storage area storing data used to perform the operation, the first storage area being external to the coprocessor, and (iii) a second storage area to store data obtained as a result of an operation performed by the coprocessor, the second storage area being external to the coprocessor, the request instruction including (i) a field storing an instruction identification code to distinguish the request instruction from other types of instructions included in all instructions executable on the main processor, (ii) a field storing a coprocessor operation code specifying the type of the operation to be performed by the coprocessor, (iii) a field storing first data that specified, as the first storage area, one of a plurality of registers included in the main processor, and (iv) a field storing second data that specifies, as the second storage area, one of the plurality of registers included in the main processor; and an operation time managing unit prestoring time information indicating a time period required to complete an operation which the coprocessor is operable to perform, for each type, wherein when generating, at a position after the request instruction in the instruction sequence, an operation instruction corresponding to an operation to be performed using data in the register in the main processor specified by the second data included in the request instruction, the instruction sequence generating unit (i) specifies a time period required to complete the operation the type of which is designated by the coprocessor operation code included in the request instruction, based on the time information stored in the operation time managing unit, and (ii) inserts instructions whose number is equivalent to or exceeds the specified time period, between the operation instruction and the request instruction.

* * * * *

UNITED STATES PATENT AND TRADEMARK OFFICE
CERTIFICATE OF CORRECTION

PATENT NO. : 7,395,410 B2 Page 1 of 1
APPLICATION NO. : 11/172601
DATED : July 1, 2008
INVENTOR(S) : Masaki Maeda et al.

It is certified that error appears in the above-identified patent and that said Letters Patent is hereby corrected as shown below:

In the Claims:
In Claim 3, Column 32, line 58, "reciuest" should be --request--.

Signed and Sealed this

Thirtieth Day of September, 2008

JON W. DUDAS
*Director of the United States Patent and Trademark Office*